(12) United States Patent
Missotten et al.

(10) Patent No.: US 10,420,280 B2
(45) Date of Patent: Sep. 24, 2019

(54) LIFTABLE SECONDARY CUTTING UNIT FOR A COMBINE HARVESTER

(71) Applicants: CNH Industrial Belgium nv, Zedelgem (BE); ESM Ennepetaler Schneid- und Mähtechnik GmbH & Co. KG, Ennepetal (DE)

(72) Inventors: Bart M. A. Missotten, Herent (BE); Willem Vandamme, Ichtegem (BE); Alexander Nürnberg, Herdecke (DE); Wolfgang Oehler, Wipperfürth (DE)

(73) Assignees: CNH Industrial Belgium nv, Zedelgem (BE); ESM Ennepetaler Schneid- und Mähtechnik GmbH & Co. KG, Ennepetal (DE)

( * ) Notice: Subject to any disclaimer, the term of this patent is extended or adjusted under 35 U.S.C. 154(b) by 0 days.

(21) Appl. No.: 14/904,026

(22) PCT Filed: Jul. 8, 2014

(86) PCT No.: PCT/EP2014/064660
§ 371 (c)(1),
(2) Date: Jan. 8, 2016

(87) PCT Pub. No.: WO2015/004165
PCT Pub. Date: Jan. 15, 2015

(65) Prior Publication Data
US 2016/0183460 A1 Jun. 30, 2016

(30) Foreign Application Priority Data

Jul. 8, 2013 (DE) .................. 10 2013 107 146

(51) Int. Cl.
*A01D 41/14* (2006.01)
*A01D 41/06* (2006.01)
*A01D 34/835* (2006.01)

(52) U.S. Cl.
CPC ....... *A01D 41/145* (2013.01); *A01D 34/8355* (2013.01); *A01D 41/06* (2013.01)

(58) Field of Classification Search
CPC ...... A01D 41/14; A01D 41/145; A01D 41/06; A01D 34/8355; A01D 43/10–43/107
See application file for complete search history.

(56) References Cited

U.S. PATENT DOCUMENTS

| 983,477 A | * | 2/1911 | Brown | ............... A01D 34/8355 172/31 |
| 1,147,588 A | * | 7/1915 | Yokley | ............... A01D 34/8355 172/31 |

(Continued)

FOREIGN PATENT DOCUMENTS

| EP | 0212185 B1 | * | 9/1990 | ......... A01D 34/8355 |
| EP | 1 378 159 B1 | | 1/2004 | |

(Continued)

*Primary Examiner* — Alicia Torres
*Assistant Examiner* — Adam J Behrens
(74) *Attorney, Agent, or Firm* — Peter K. Zacharias; Patrick M. Sheldrake

(57) ABSTRACT

A header for a combine harvester has a primary implement, a secondary implement and a link that is connected with the secondary implement. The header further has a lifting device with a slide element that is formed and connected with the link so that a translational movement of the slide element causes a lifting of the secondary implement relative to the primary implement.

14 Claims, 31 Drawing Sheets

(56) References Cited

U.S. PATENT DOCUMENTS

| | | | | |
|---|---|---|---|---|
| 1,813,631 A * | 7/1931 | Minor | A01D 34/8355 |
| | | | 172/297 |
| 2,401,513 A * | 6/1946 | Schmidt | A01D 47/00 |
| | | | 56/238 |
| 3,623,304 A * | 11/1971 | Molzahn | A01D 41/145 |
| | | | 56/10.2 R |
| 4,126,987 A * | 11/1978 | Sarich | A01D 34/26 |
| | | | 56/208 |
| 4,715,174 A | 12/1987 | Lloyd et al. | |
| 5,433,065 A * | 7/1995 | Mosby | A01D 34/8355 |
| | | | 56/13.9 |
| 6,993,360 B2 | 1/2006 | Plahte et al. | |
| 8,919,088 B2 | 12/2014 | Dow et al. | |
| 9,554,510 B2 * | 1/2017 | Nurnberg | A01D 34/8355 |
| 2010/0083627 A1 * | 4/2010 | Nagy | A01D 34/8355 |
| | | | 56/60 |
| 2014/0165527 A1 * | 6/2014 | Oehler | A01D 34/435 |
| | | | 56/229 |
| 2014/0237980 A1 * | 8/2014 | Verhaeghe | A01D 41/145 |
| | | | 56/320.1 |
| 2014/0311115 A1 * | 10/2014 | Verhaeghe | A01D 34/8355 |
| | | | 56/251 |
| 2014/0319253 A1 * | 10/2014 | Nurnberg | A01D 34/8355 |
| | | | 241/101.4 |

FOREIGN PATENT DOCUMENTS

| | | | | |
|---|---|---|---|---|
| EP | 1483953 A1 * | 12/2004 | | A01D 34/8355 |
| EP | 1483953 A1 | 12/2004 | | |
| EP | 1932416 A1 | 6/2008 | | |
| FR | 2329183 A2 | 5/1977 | | |
| FR | 2730126 A1 * | 8/1996 | | A01D 34/8355 |
| JP | 2807215 B2 * | 10/1998 | | A01D 34/8355 |
| JP | 2014171419 A * | 9/2014 | | A01D 41/06 |

* cited by examiner

LIFTABLE SECONDARY CUTTING UNIT FOR A COMBINE HARVESTER

This application is the US National Stage filing of International Application Serial No. PCT/EP2014/064660 filed on Jul. 8, 2014 which claims priority to German Application 10.2013.107.146.5 filed Jul. 8, 2013, each of which is incorporated herein by reference in its entirety.

TECHNICAL FIELD OF THE INVENTION

The invention concerns a header for a combine harvester with a primary implement and a secondary implement.

A combine harvester has a front harvesting device—the so-called "header"—comprising a main cutting unit. The main cutting unit is the primary implement of the combine harvester with which the crop, e.g. wheat, is cut. Typically, the secondary implement is mounted at the rear of the "header" and serves to fulfil an additional function.

In particular, the combine harvester can be configured so that its main cutting unit for the crop is set at a relatively large horizontal distance from the ground ("high cut"). in this way, the mass of the stems fed into the combine harvester is reduced. The secondary implement, configured as a cutting implement, serves the purpose of cutting off the remaining, comparatively long stubbles from the ground and to cut them up.

The secondary implement can fulfil various functions. In particular, it can encompass cutting-off, cutting-up, comminuting or chopping. Other possible operations are ground processing, opening up of the ground, collection of vegetal components, sowing, etc. For instance, the secondary implement can also be a mower, a cutting unit, or a swathing arrangement.

STATE OF THE ART

A header for a combine harvester is known from international patent application WO 2013/011138 A1. The header is a primary implement which is formed as the main cutting unit of the combine harvester. The header further has a secondary implement, which is formed as a cutting unit. The secondary implement is coupled to the header and thus to the cutting unit by means of upper and lower links.

A further header of this type for a combine harvester is known from German patent application DE 10 2011 051 981 A1.

Object of the Invention

The present invention seeks to solve the problem of providing a header for a combine harvester with a primary implement and a secondary implement for which the risk of damage to this secondary implement when moving over impediments is reduced and the header can be better transported on the road.

Solution

According to the invention, the problem is solved by the features of the independent claims.

Further preferred embodiments according to the invention can be found in the dependent claims.

DESCRIPTION OF THE INVENTION

The invention relates to a header for a combine harvester comprising a primary implement, a secondary implement and a link that is connected with the secondary implement. The header further has a lifting device with a slide element that is configured and connected to the link so that a translational movement of the slide element causes a lifting of the secondary implement relative to the primary implement.

BACKGROUND

In particular, the primary implement can be the main cutting unit of the combine harvester. So, for instance, it can be a grain or a maize cutting unit. In particular, the secondary implement can be a mowing unit, a cutting unit, or a swathing unit.

The secondary implement is arranged further to the rear of the header of the combine harvester than the primary implement. This means that during normal working in the forward travel of the combine harvester, first the primary implement fulfils its function, and after further movement the secondary implement fulfils its function. In normal operation, the movement of the secondary implement is arranged such that it moves parallel to the ground. This ensures an even processing of the ground.

In the case that impediments—e.g. deep ground undulations, trenches, rocks, etc.—must be crossed, the whole header, including the two implements, is lifted. However, if the header is one that is used for the so-called "high-cut" operation, there is the problem that, although the primary implement has been lifted up sufficiently high to pass over the impediment, the secondary implement, which is much closer to the ground, is too low for this. Thus, there is the danger of damage to the secondary implement when passing over the impediment.

A similar problem emerges during road transport of the header when it is dismounted from the combine harvester. When the header is separated from the combine harvester and loaded onto a trailer for road transport, then both implements attached to the harvester must be lifted over the wheels of the trailer. In the above described arrangement of displacement in the vertical direction of the two implements, the problem arises that, although the primary implement is arranged above the wheels, the secondary implement will still collide with them.

FURTHER DESCRIPTION

To overcome this problem, the new header comprises a lifting device with a slide element that is configured and connected with the link such that it causes a translational movement of the slide element thereby lifting the secondary implement relative to the primary implement. In this way, the height difference between the lowest point of the primary implement and the secondary implement is offset in whole or at least in part. The header can be guided and loaded onto a trailer without collision risk a collision. In this way, the construction space available for the protected arrangement of the secondary implement can be optimally used.

In particular, the secondary implement may be constituted by a certain type of mowing device that is used for the above-described high cut and which, for instance, is described in the international patent application WO 2013/011138 A1 of the applicants. This secondary implement comprises besides the actual cutter bar with the reciprocatingly driven knives with a plurality of blades, also a roller unit that is arranged, as seen in the direction of travel, behind the blades and at a lower level than the blades. This roller unit has rotatably arranged rollers, which contact the ground in the operational position of the combine harvester and thus ensure the desired parallel movement of the blades of the secondary implement. Besides its guide function, the roller unit can also have a further processing function for the cut crop and/or the ground, as is described in the patent application mentioned above.

With such a secondary cutting unit, the blades represent the vulnerable parts and thus the parts that need to be protected. The aim of lifting of the secondary implement is therefore to arrange the blades of the cutting unit in such a manner that they are positioned above a collision line. It is therefore preferable to lift the secondary implement relative to the primary implement so that the blades are arranged above the lowest point of the primary implement. So, the exposure of the secondary cutting unit is more a matter of this relative arrangement and less of the arrangement of the lowest point of the roller unit of the secondary implement.

This desired protected arrangement of the secondary implement—and particularly of its sensitive parts—is achieved by a suitable displacement of the slide element which connects the lifting device with the link. The lifting device is fixedly connected to the primary implement. In this respect, 'connected' means either through a direct connection or an indirect connection with an interposition of further components. In turn, the lifting device is connected via a link bearing and a coupling part—and possibly further components to the link. In turn, the link is connected either directly or indirectly via interposition of further components to the secondary implement. The secondary implement is also connected in its entirety to the primary implement wherein at least the lifting device and the link are interposed.

The movement of the slide element occurs basically in a translational manner. Primarily, this is not a primarily rotating movement, wherein "translational" movement does not mean that the movement must be strictly in a straight line. Usually this movement runs along a path at a relatively small angle between approx. 5° and 35°, particularly between 10° and 20° and preferably between 10° and 15° relative to the vertically arranged rear side of the primary implement. But the path may also be a curve. In any case, it is preferable that the movement has a primary portion in a vertical direction in order to effect the lifting or lowering of the secondary implement relative to the primary implement. In addition, there is a small movement in the horizontal direction to the rear in order to optimally use the space below the primary implement and in particular its entrance channel for the arrangement of the secondary implement.

The lifting device can have an actuating device which, in particular, is a piston-cylinder unit and which can be driven in a translational manner such that its translation movement is transferred onto the secondary implement and that this is then lifted. The actuating device allows an automatic lifting of the secondary implement in a reliable and simple manner. The translational upward movement of the actuating device is converted into a corresponding translational upward movement of the secondary implement. It is understood that the opposite translational downward movement of the actuating device corresponds to the translational downward movement of the secondary implement and that this is then lowered. So, there preferably exists a predetermined maximum lifting position and a predetermined minimal lifted position (or also lowered position). In the lowered position, the secondary implement takes its operating position relative to the primary implement. It is further possible that the lifting device has a further predetermined intermediate position or an intermediate position, freely determined by the operator.

In particular, the piston-cylinder unit is configured hydraulically. The relative movement between the piston and the cylinder then corresponds approximately to that of the translational movement of the lifting device. With such a piston-cylinder unit, it is, in particular, comfortable to initiate and control the lifting and lowering process from the driver's cabin of the combine harvester.

The lifting device can have a guide part with a guide slot. The slide element can have a guide element that engages in the guide slot. Therein, the link is connected with the slide element in a rotating manner. The slide element is fixedly connected with the guide part with the exception of the degree of freedom provided by the guide slot. The guide element can, for instance, be a guide pin, or, preferably, a rotatable seated guide roll. Advantageously, there is a plurality of guide elements and in particular at least two guide rolls. The translational movement of the actuating device is transferred to the slide element in such a manner that the slide element is moved along the movement track provided by the guide slot relative to the guide component. The link is thus swung about its link bearing at the slide element. In its entirety, the translational movement of the actuating device causes a translational movement of the guide element of the slide element in the guide slot of the guide component and thus the lifting of the secondary implement relative to the primary implement.

The header normally has a lower link that is usually designed specifically for the header. The lower link connects a lower part of the secondary implement with a lower part of the primary implement. In turn, an upper part of the secondary implement is connected via a link configured as an upper link with the lifting device and thus with an upper part of the primary implement. This bearing point of the upper link is lifted by the lifting device in such a manner that the whole of the secondary implement, and thus also its parts to be protected, are lifted up. In this, the lower link is swivelled. Therein, the maximum free space above the ground is achieved for the secondary implement and is no longer defined by the maximum achievable lift height of the header.

Whilst the lower link is usually specifically configured for the respectively used secondary implement, the upper link and/or the lifting device can be designed to be universally used so that the lifting device can be used for a multiplicity of different implements. This then allows not only a simple original equipping of the header with a new lifting device but also the cheap retrofitting of the new lifting device on existing headers.

The lifting device can be configured so that the secondary implement is only lifted relative to the primary implement when the secondary implement is released from the ground by a lifting of the header. This ensures that an unwanted lifting of the secondary implement during the operation of the combine harvester is prevented. Therefore, the secondary implement cannot be lifted in the operating position of the header, but only raised into a lifted non-operational position of the header. With the release of the secondary implement from the ground, its weight force has, in a certain manner, via the upper link an effect on the lifting device and only then enables it through the triggering of the lifting of the secondary implement relative to the primary implement by means of the lifting device and its actuating device.

The lifting device can have a safety device that prevents an unwanted lifting of the secondary implement relative to the primary implement. An unwanted or incorrect activation of the actuating device of the lifting device, therefore, does not lead to a lifting of the secondary implement relative to the primary implement. The safety effect is based on a suitable alternating preventing or permitting translational and rotational movements of the elements of the safety device and the lifting device. In particular, the safety device can thus be configured so that its safety function is controlled by gravity, as will be described further down.

The safety device can have a safety latch, a safety slot and a safety spring, whereby the safety latch is loaded by means of the safety spring in the direction of the safety slot. The safety effect is based in part on a form-fitting engagement of the safety latch into the safety slot during certain operating conditions. In another part it is based on the fact that the safety spring of the safety latch presses into the safety slot, insofar as the spring force is not overcome and thus prevents a certain movement and forces another movement.

The lifting device can have an actuating device and the safety device a safety position, a release position and a locked position. The safety latch engages in the safety position in the safety slot and an activation of the actuating device does not lead to the lifting of the secondary implement. This is achieved in that a rotational movement of the latch is prevented in the safety position by the safety spring. The spring force of the safety spring is dimensioned and adapted to the mass of the secondary implement such that the various positions of the safety device are automatically taken up. The safety position of the safety device is allocated to the normal operating position of the header. This means that it is automatically taken up when the secondary implement does not act with its full weight force on the lifting device—meaning that the header is not lifted and the secondary implement has contact with the ground In the release position, the safety latch also engages in the safety slot but an activation of the actuating device leads to the safety latch being released and subsequently the secondary implement is lifted up. The release position is automatically taken up when the header is lifted so far that the secondary implement is released from the ground and thus acts on the lifting device with its full weight force. In the release position the weight force of the secondary implement acts downward on the slide element.

The dimensioning occurs in dependence of the mass of the secondary implement so that in the release position with an activation of the actuating device, the translational movement of the slide element in the guide slot of the guide component is prevented due to the weight force of the secondary implement. Instead, there follows a slight curve-shaped translational movement of the pin connecting the piston with the latch and the slide element in a release slot of the slide element. This movement is transferred by the pin to the latch that is rotationally supported in a bearing at the slide element. In this way, the latch overcomes the spring force of the spring, is swivelled by the actuating device, moves out of the safety slot and achieves the released position.

When the pin has reached the upper end of the release slot in the slide element, then the curve-shaped translational movement and the resulting swivel movement of the latch is ended. With a further extension of the piston, the force at this contact point is transferred from the latch to the slide that is then moved upward in a translational manner in the guide slot of the guide component. This causes the released lifted position that is allocated to the lifting of the secondary implement to be reached.

Starting from the basic position of the safety device—the safety position—alternatively to the release position, the locked position can be taken up. The locked position is automatically taken up when the secondary implement does not act on the lifting device with its full weight force—thus the secondary implement is not yet released from the ground—and the actuating device is activated to lift the secondary implement upward. The locked position is further taken up and prevents an unwanted lifting of the secondary implement relative to the primary implement, also when the actuating device is further activated or remains activated.

The safety latch engages in the locked position in the safety slot such that an activation of the actuating device leads to the safety latch not being released from the safety slot and the secondary implement cannot be lifted. Contrary to the release position, the lack of the weight force also means that the spring force or the moment it applies—is not overcome when activating the actuating device. Thus, the safety latch is not swung out of the safety slot but moves upward in it, in a translational manner. But only a very short travel is possible in this direction, as the slide ends here so that the locked position is taken up very quickly. In the locked position neither a translational movement of the slide relative to the guide component nor a swivelling movement of the safety latch is possible. The only possible movement is the return movement into the safety position by a small return movement of the piston in the cylinder.

The safety slot can be used for preparing the various positions described above of the safety device, in particular in a somewhat L-shaped form. So, the one end of the "L" is designed to be open-ended and the other closed-ended. The closed-ended part is allocated to the locked position. The transfer zone between the two legs is allocated to the safety position and the release position. When the safety latch has moved out of the open ended part of the "L", then the released position is taken up.

The invention further concerns a lifting device for a header for a combine harvester. The lifting device has a guide component with a guide slot, a slide element, and an actuating device. The slide element has a guide element engaging in the guide slot and a link bearing for a link connected to the secondary implement of the combine harvester. The actuating device is configured to be movably driven in a translational manner such that its translational movement causes a translational movement of the guide element in the guide slot and thus a lifting of the secondary implement. In particular, the lifting device can be configured as described above.

Advantageous developments of the invention are found in the claims, the description and the drawings. The advantages of the features and of combinations of several features mentioned in the description are only examples and can be effective alternatively or cumulatively without the advantages having to be achieved according to the present embodiments. Without the object of the appended claims being changed, the following applies, according to the disclosure of the original application documents and the patent: further features can be taken from the drawings—in particular, the depicted geometries and the relative dimensions of several components together as well as their relative arrangements and operational connections. The combination of features of different embodiments of the invention or of features of various claims also deviates from the selected references of the claims and is hereby proposed. This also applies to such features that are shown in separate drawings or that are mentioned in their description. These features can also be combined with features of various claims. Also the features mentioned in the claims, can be used for further embodiments of the invention.

The features mentioned in the claims and in the description are to be understood as regards their quantity, that exactly this quantity or a larger quantity than that mentioned is available without the requirement of an explicit use of the "at least" adverb. Therefore, when, for instance, the term lifting device is used, it is to be understood that exactly one lifting device, two lifting devices, or several lifting devices are provided. These features can also be supplemented by other features or can be the only ones that make up the respective apparatus.

The reference numbers contained in the claims do not represent a limitation of the scope of the protected objects of the claims. Their purpose is solely to clarify the claims.

BRIEF DESCRIPTION OF THE FIGURES

In the following, the invention is further detailed and described on the basis of the depicted preferred embodiments.

DESCRIPTION OF THE FIGURES

Figure 1:
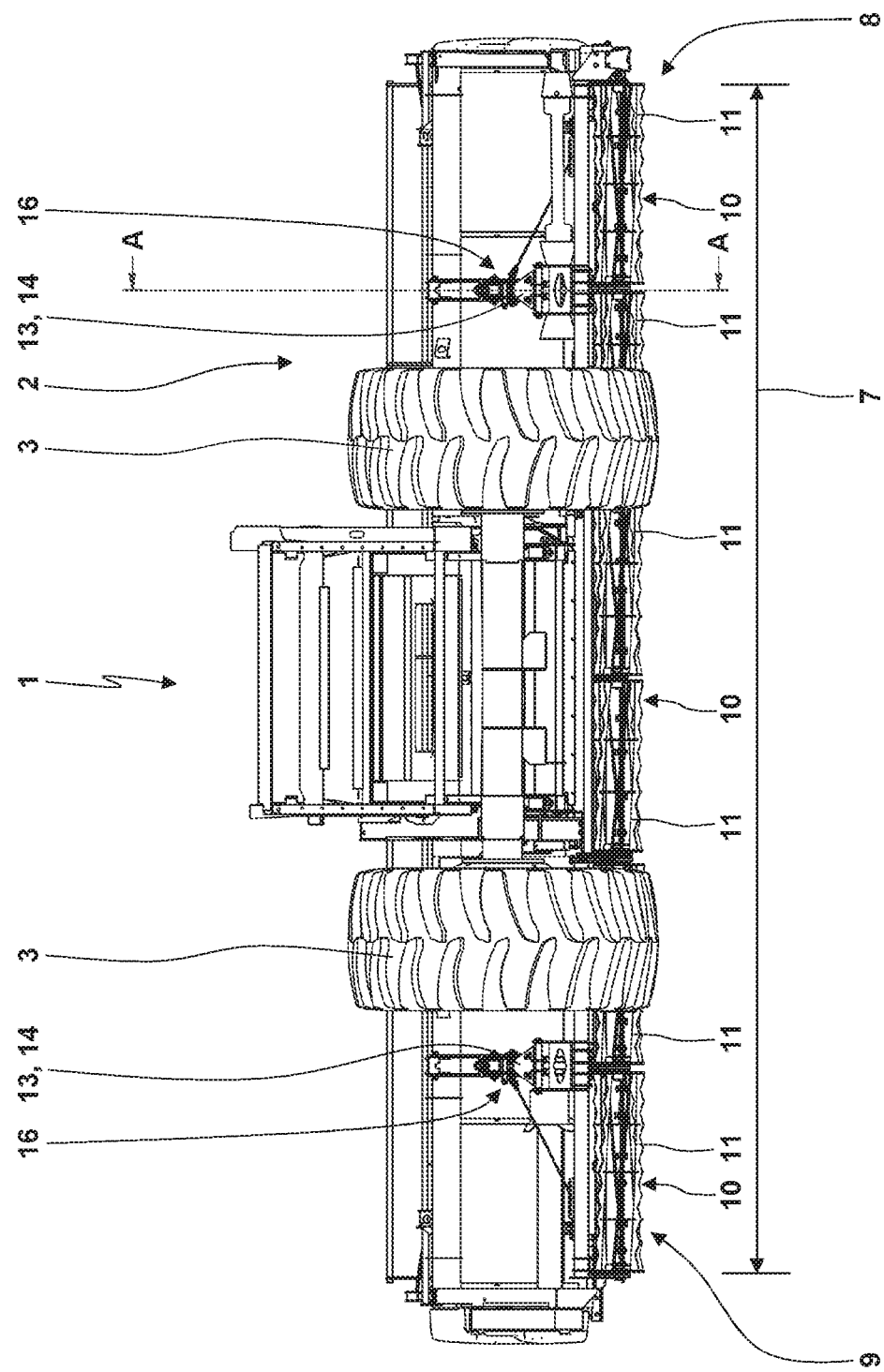
FIG. 1 shows a rear view of a first exemplary embodiment of the new header for a combine harvester in its operational position.

FIGS. 1-7 show various views of an exemplary embodiment of a combine harvester 1 with a new header 2. When the respective figure shows a rear view or view from the rear, then it is to be understood that the respective view is seen when looking in the direction of travel 4 from the rear. This is applies to the other Figures. Only the front portion of the combine harvester 1 is shown, as the remainder of the combine harvester 1 has no importance for this invention.

The combine harvester 1 can be driven, and for this purpose has several wheels of which these figures only show the front wheels 3. In order to carry out its work, the combine harvester 1 travels in the direction of travel 4 over the ground 5. As the wheels tend to sink into the ground 5 and the tires deform, the depiction is simplified in such a manner that the lower part of the front wheels 3 are shown here as being below the ground 5.

The combine harvester 1 has a primary implement 6, which is its main cutting implement and serves for the actual harvesting process. The primary implement 6 defines the working width 7 of the combine harvester 1 perpendicularly to the direction of travel 4. The primary implement 6 itself is not an object of the present application and is thus not described in detail below.

Figure 2:
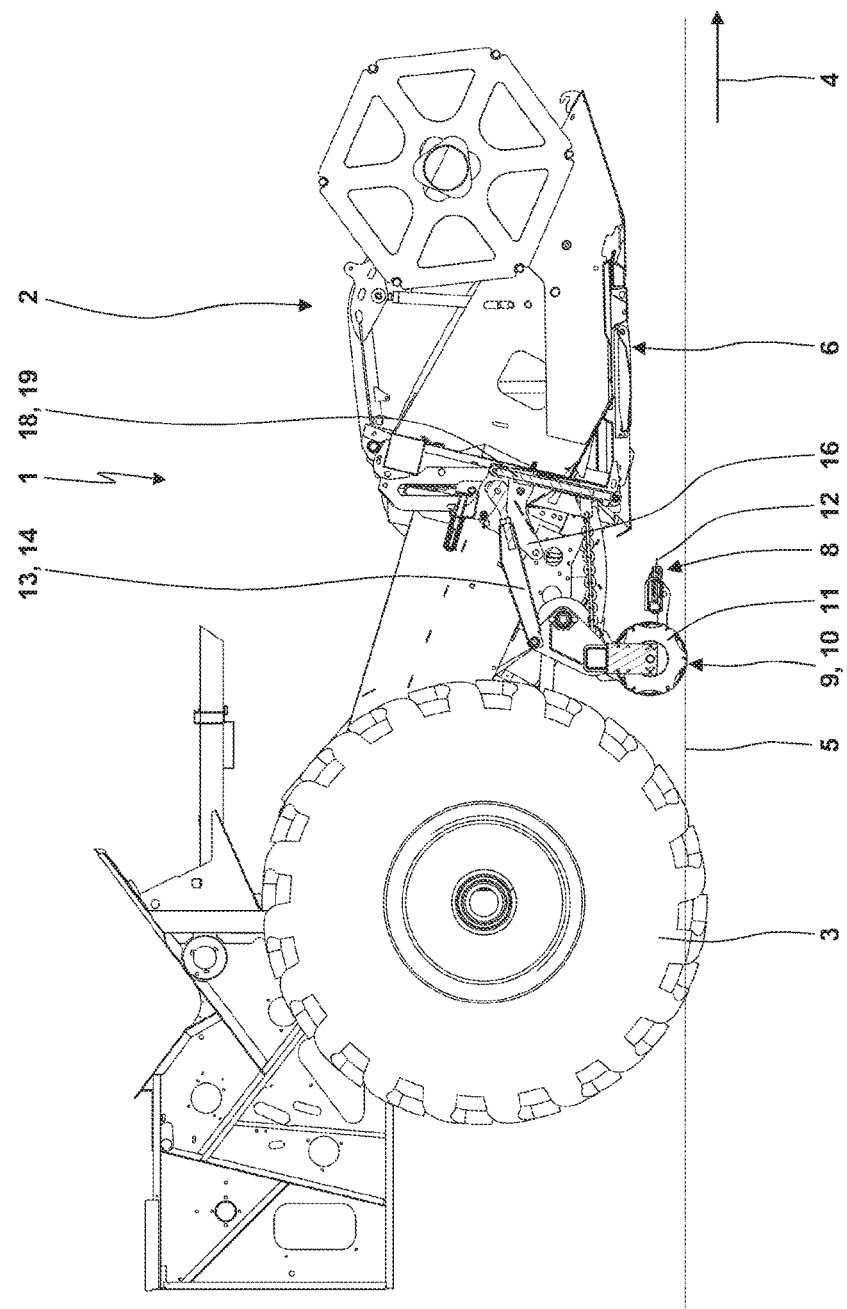
FIG. 2 shows a sectional view of the header according to section A-A in FIG. 1.
Figure 3:
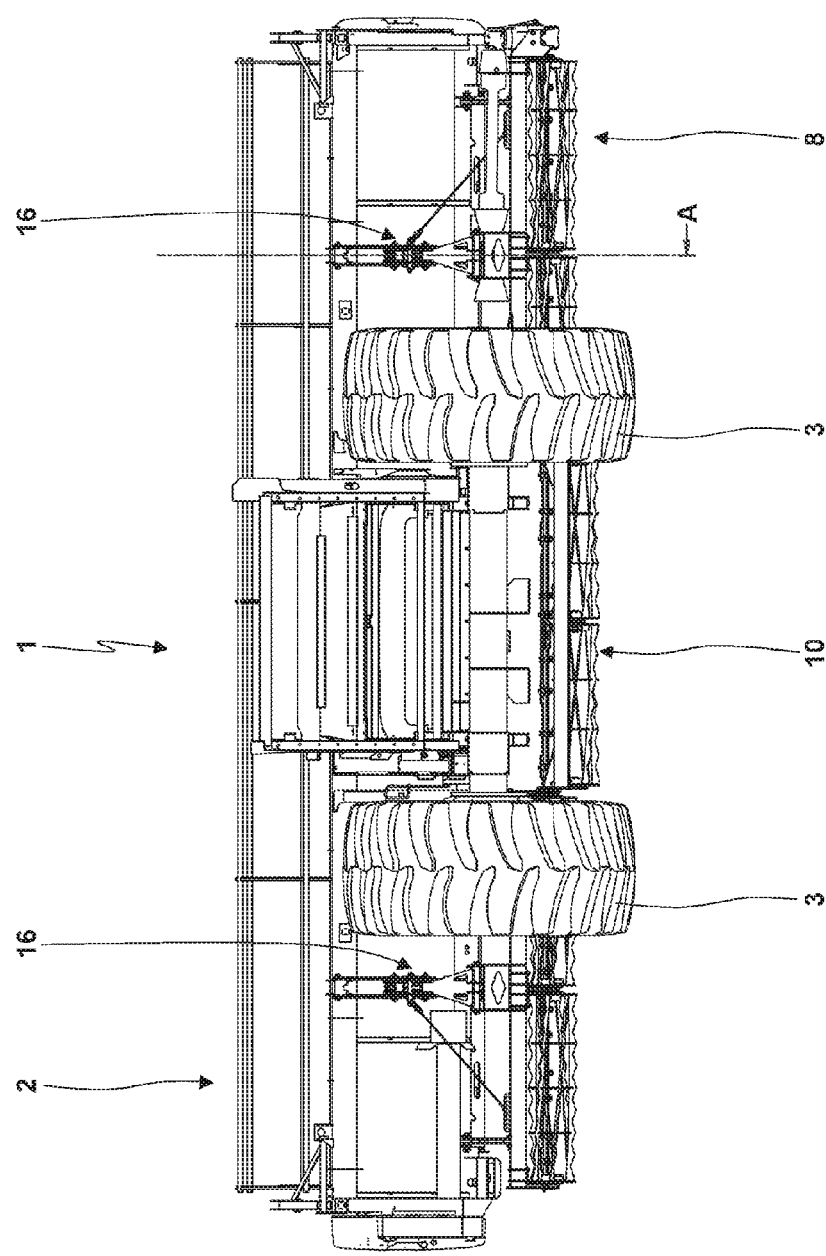
FIG. 3 shows a rear view of the header in its lifted position
Figure 4:
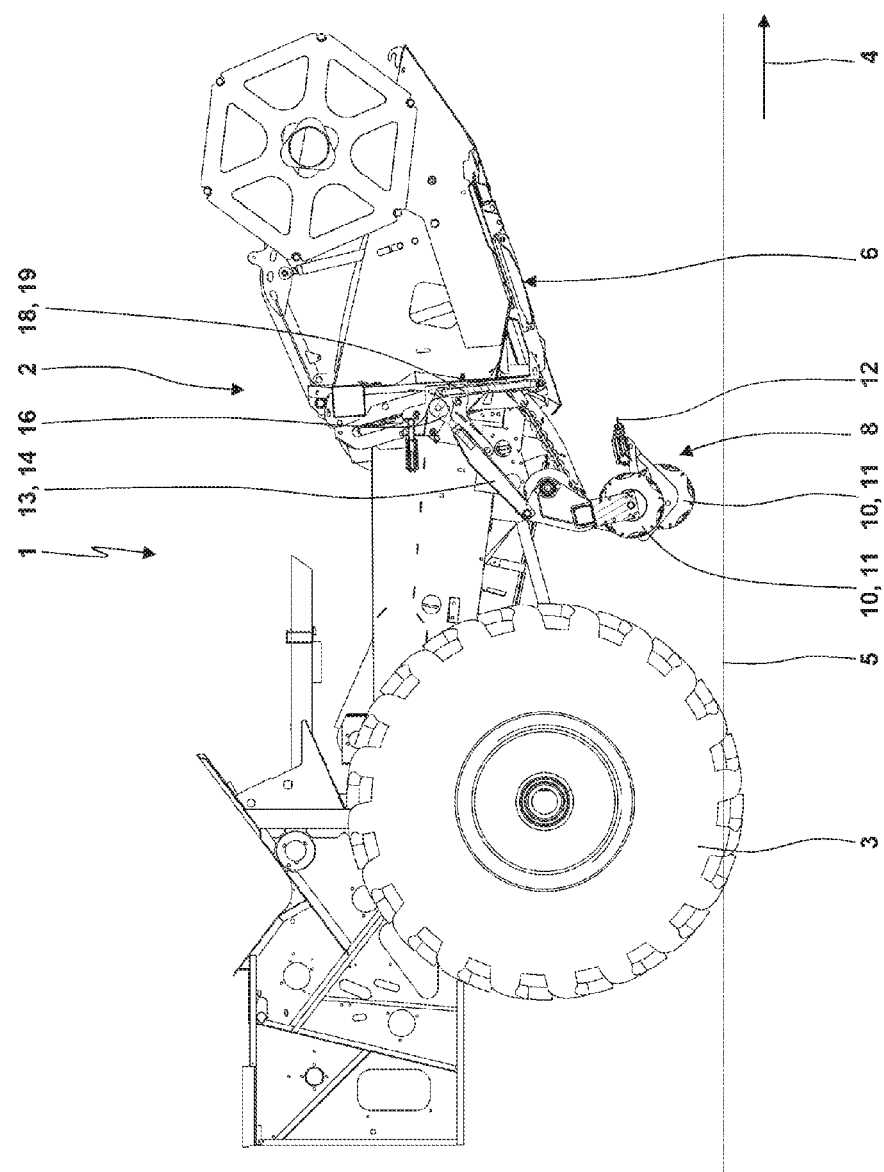
FIG. 4 shows a sectional view of the headers according to line A-A in FIG. 3.
Figure 5:
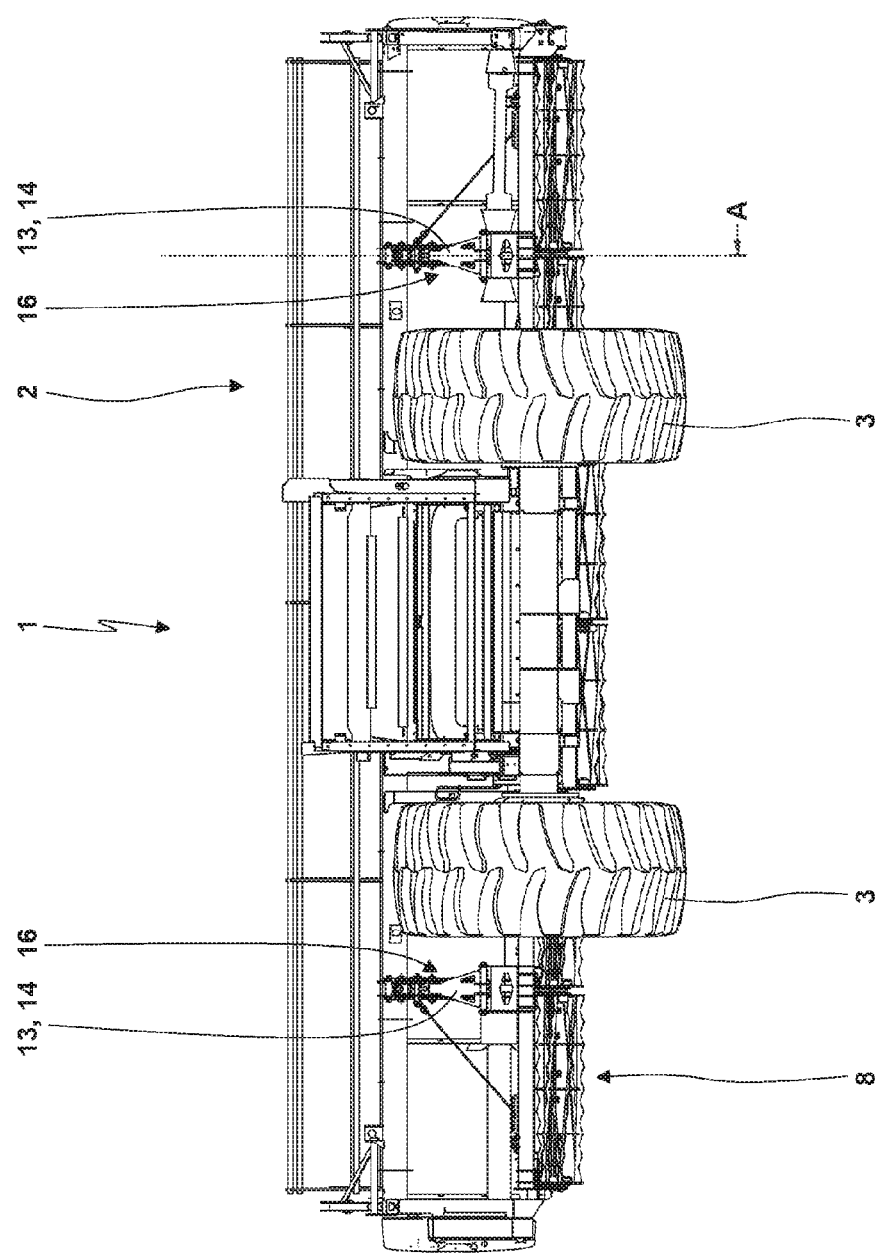
FIG. 5 shows a rear view of the header in its lifted position with the secondary implement lifted relative to the primary implement.
Figure 6:
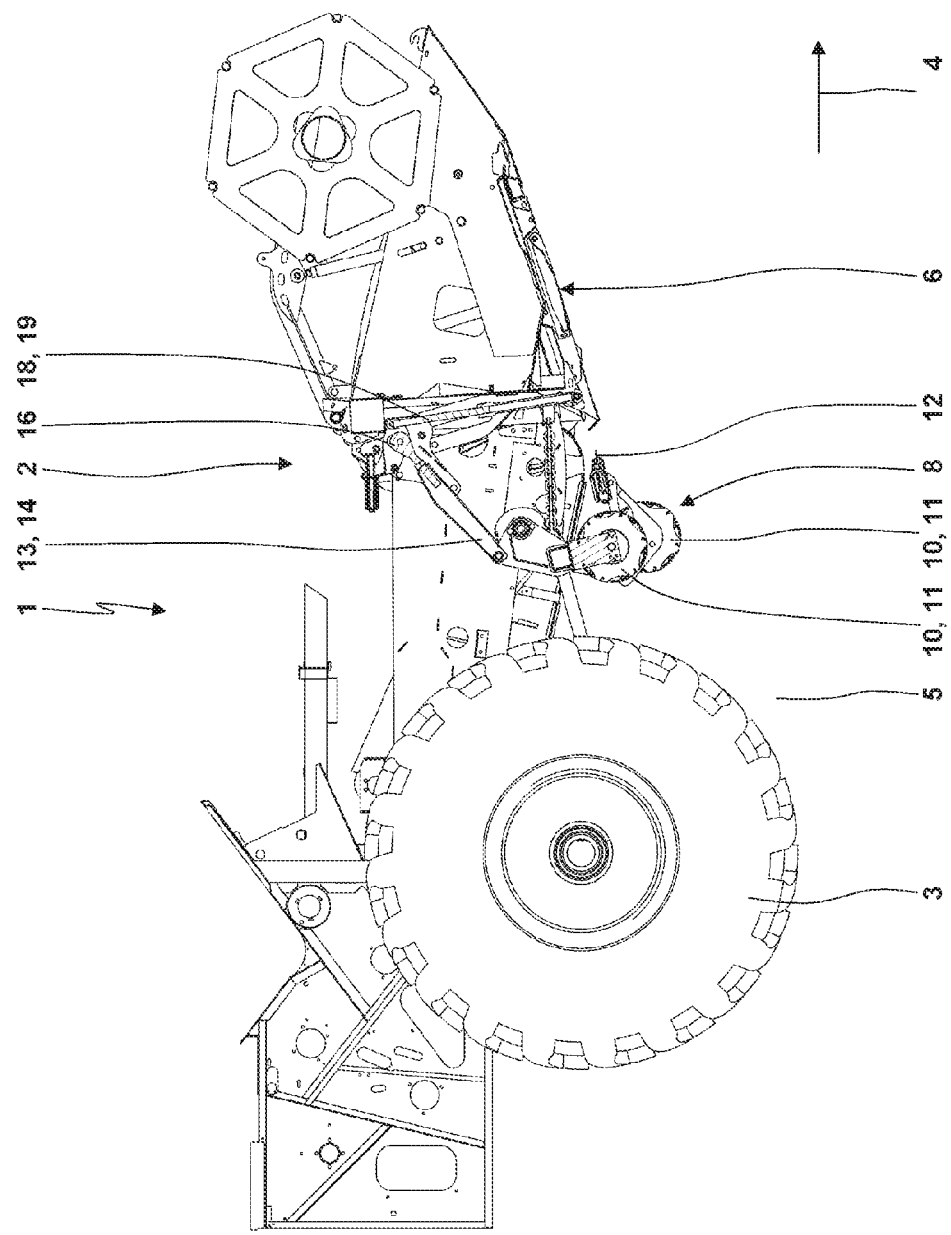
FIG. 6 shows a sectional view of the header according to line A-A in FIG. 5.
Figure 7:
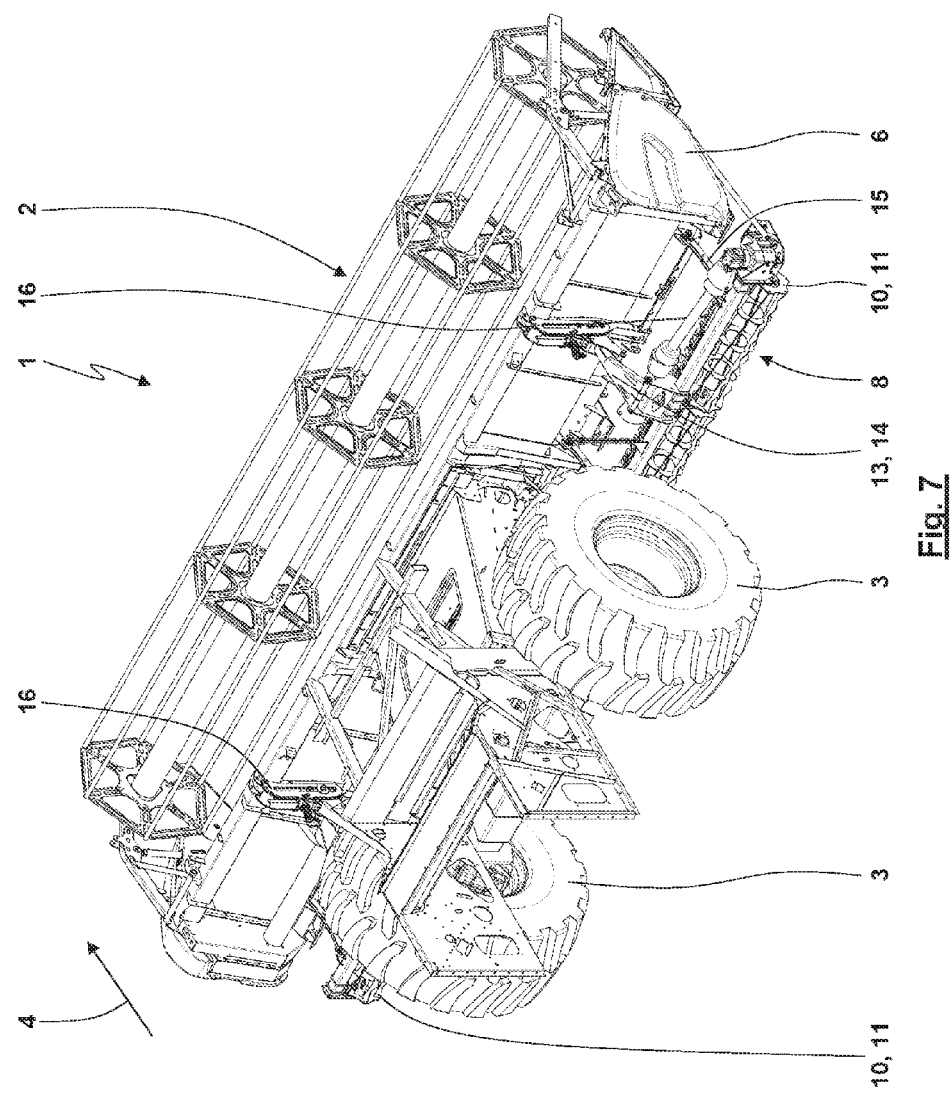
FIG. 7 shows a perspective view of the header and a part of the combine harvester
Figure 8:
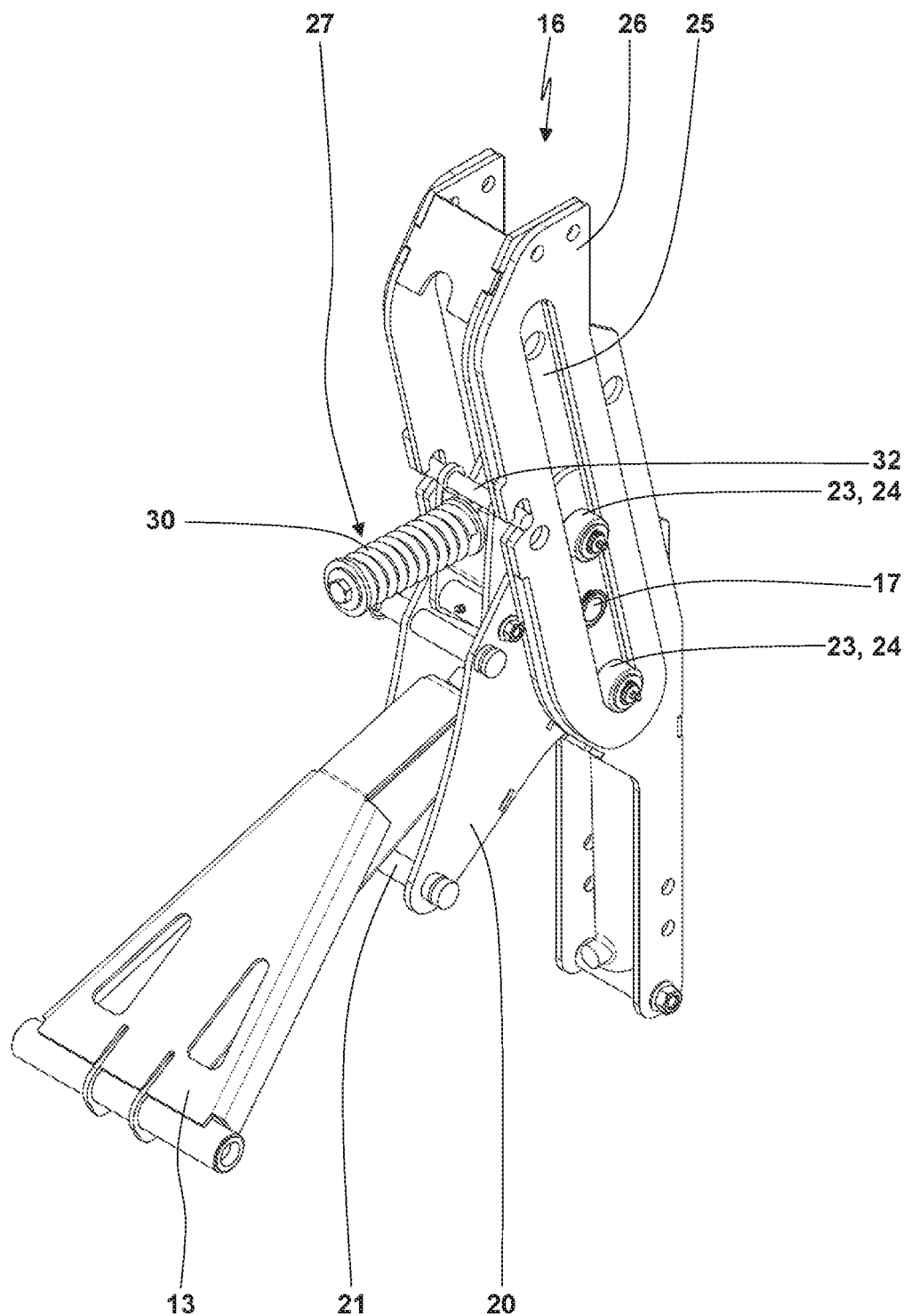
FIG. 8 shows a perspective view of a first exemplary embodiment of the new lifting device of the new header with a safety device in the safety position.
Figure 9:
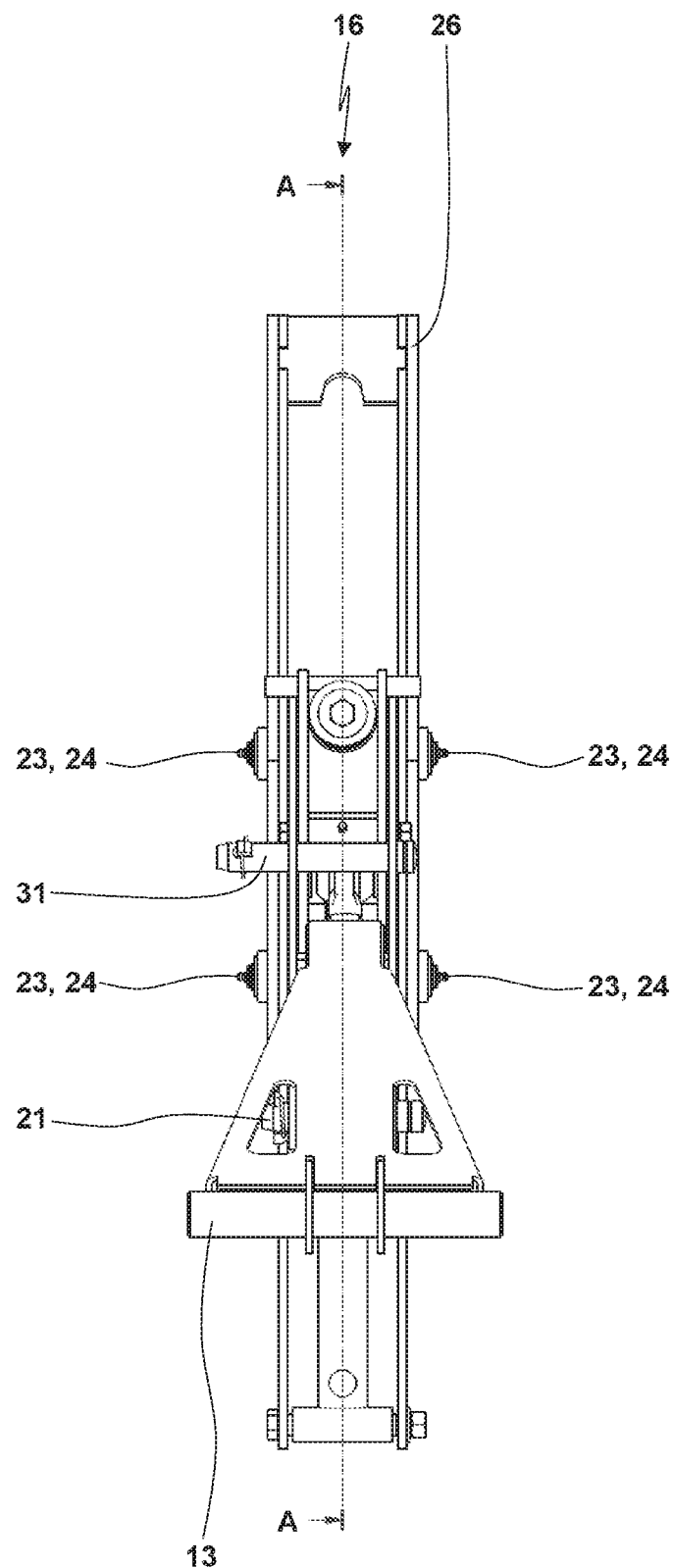
FIG. 9 shows a rear view of the lifting device according to FIG. 8.
Figure 10:
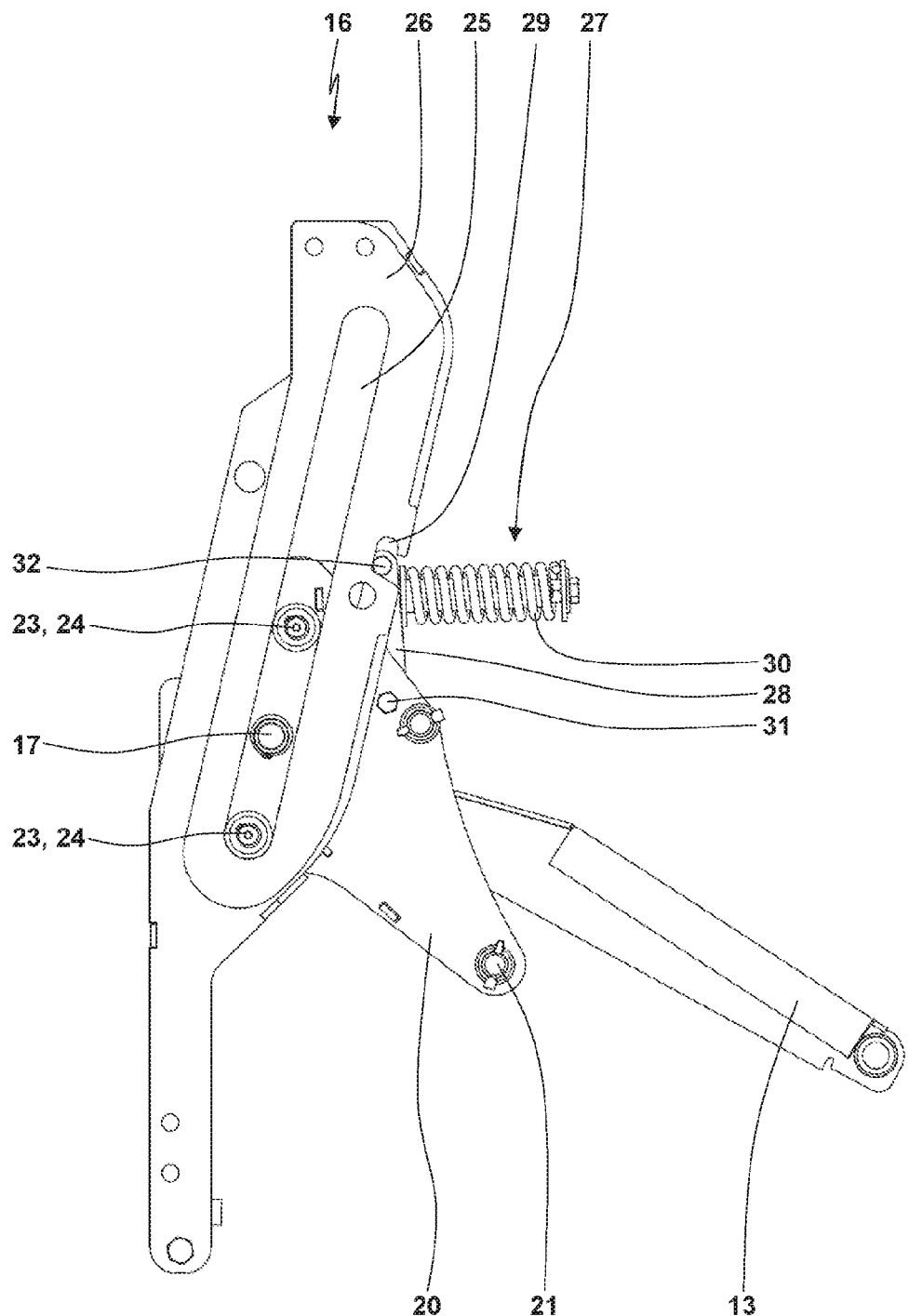
FIG. 10 shows a side view of the lifting device according to FIG. 8.
Figure 11:
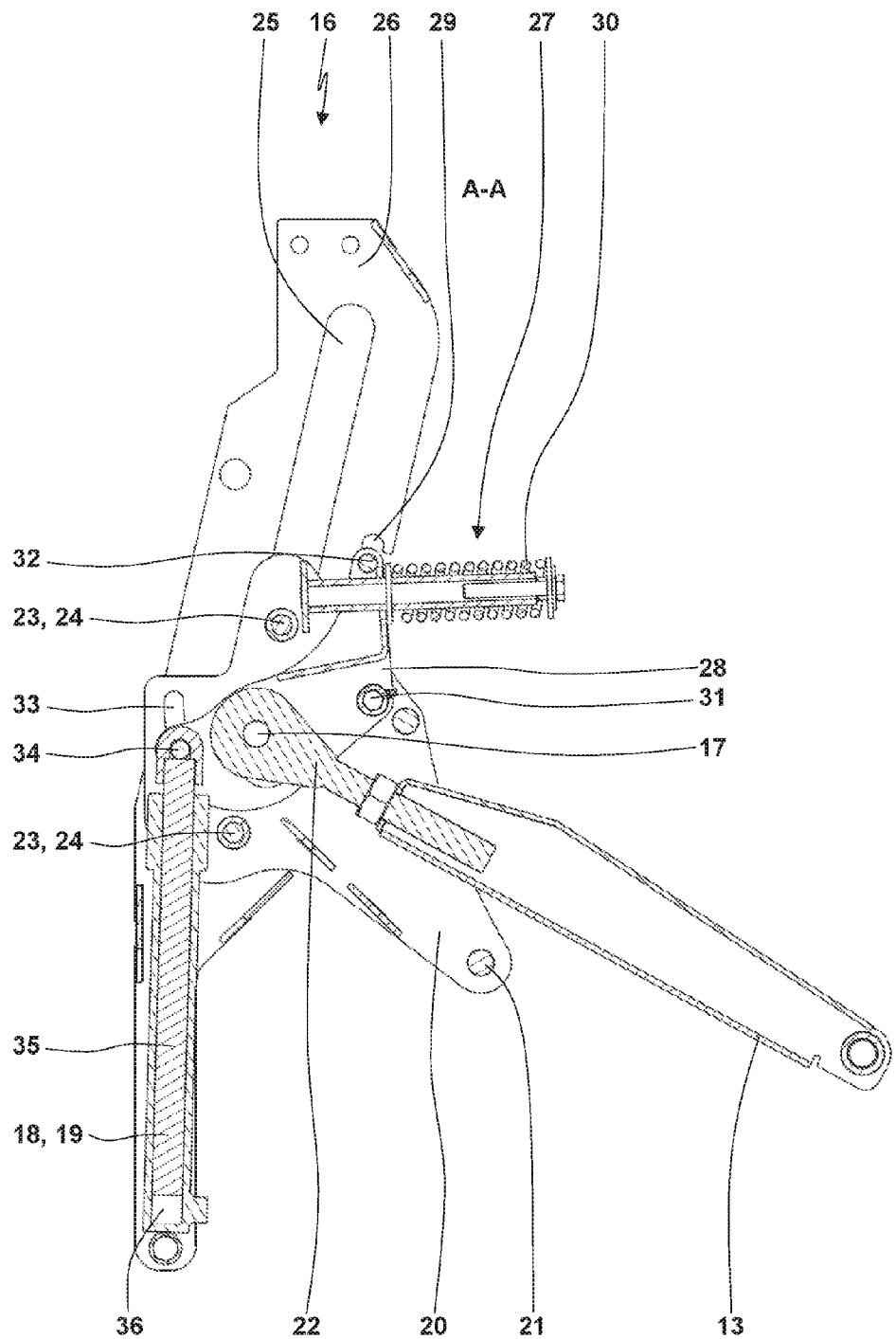
FIG. 11 shows a sectional view of the lifting device according to line A-A in FIG. 9.
Figure 12:
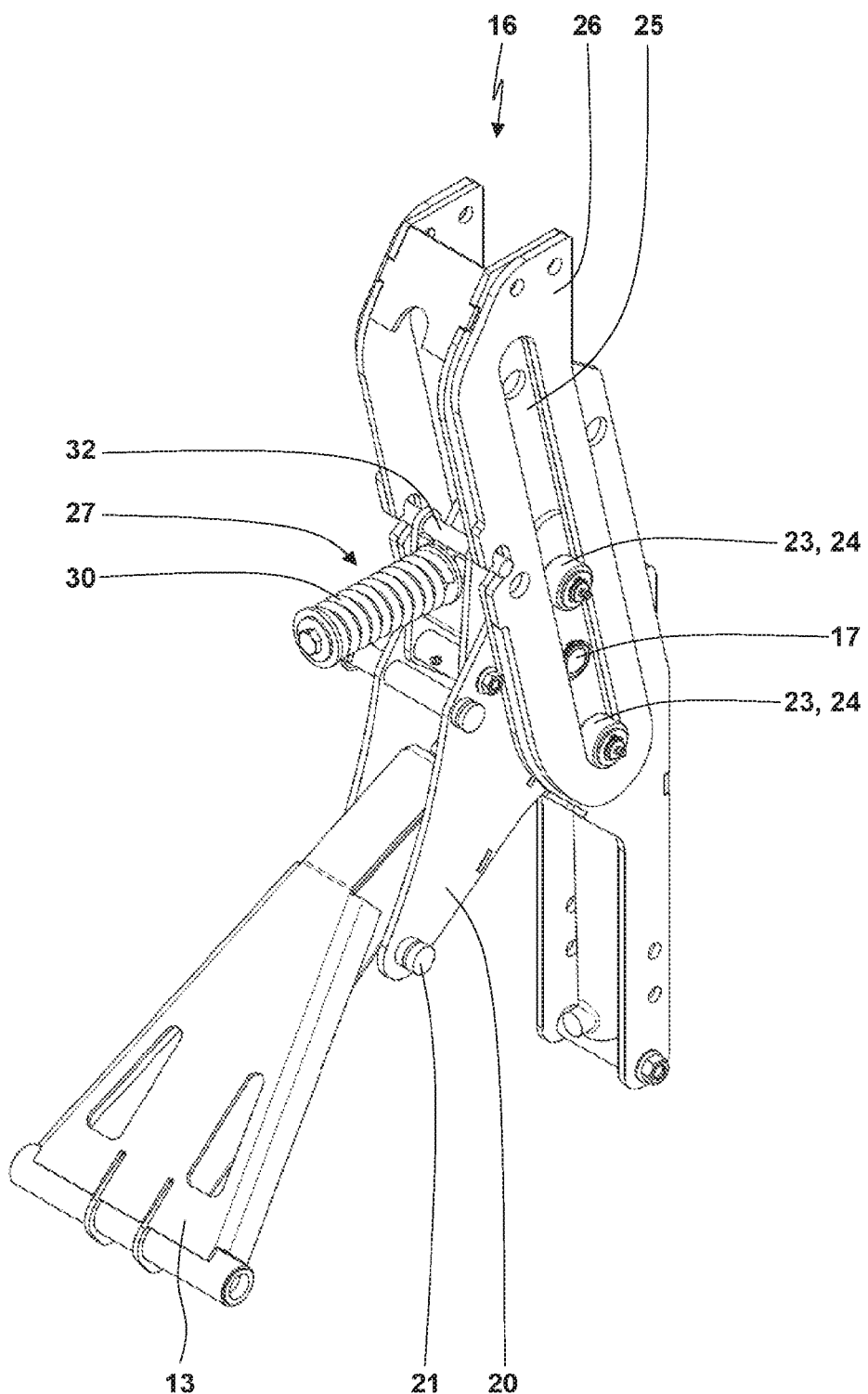
FIG. 12 shows a perspective view of the lifting device with the safety device in the release position
Figure 13:
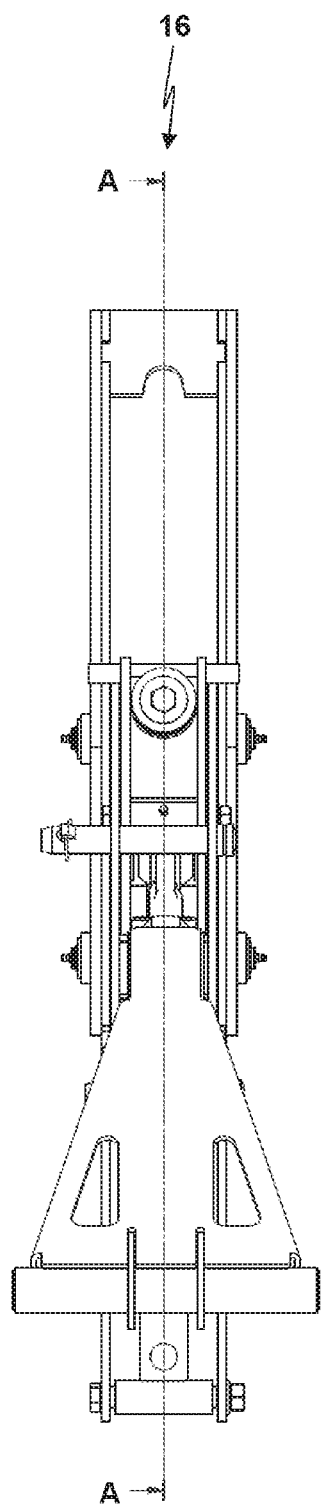
FIG. 13 shows a rear view of the lifting device according to FIG. 12.
Figure 14:
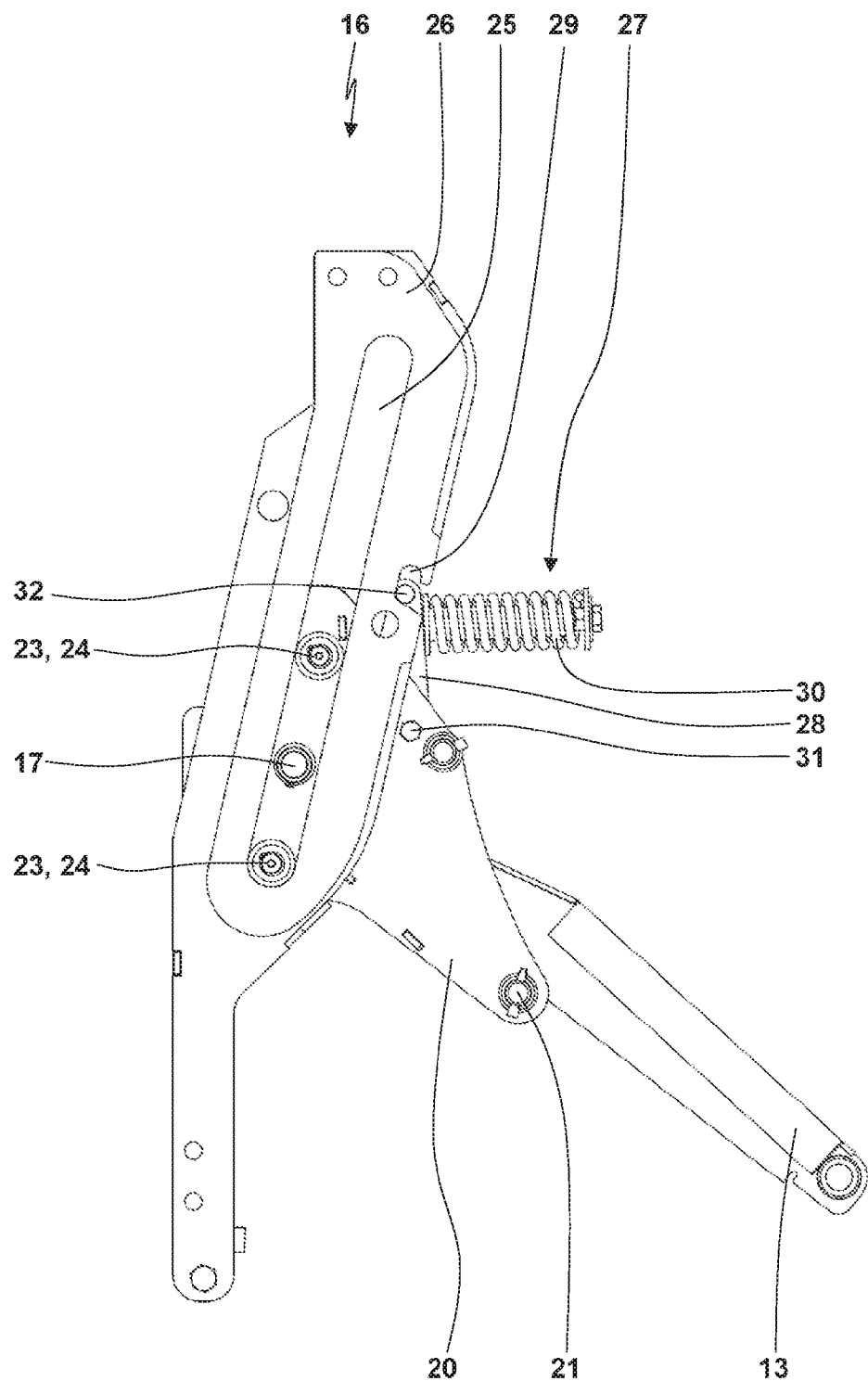
FIG. 14 shows a side view of the lifting device according to FIG. 12.
Figure 15:
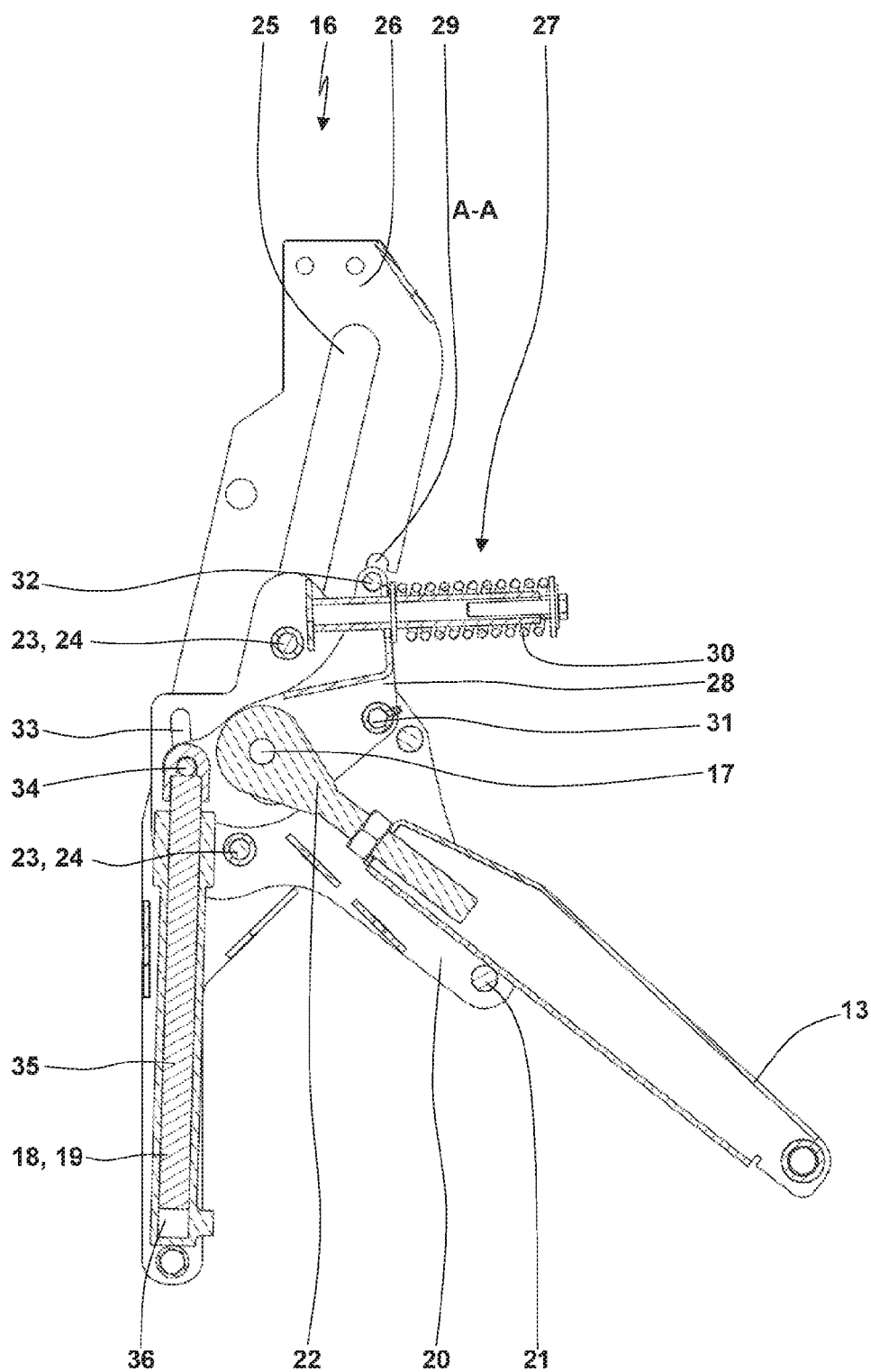
FIG. 15 shows a sectional view of the lifting device according to line A-A in FIG. 13.
Figure 16:
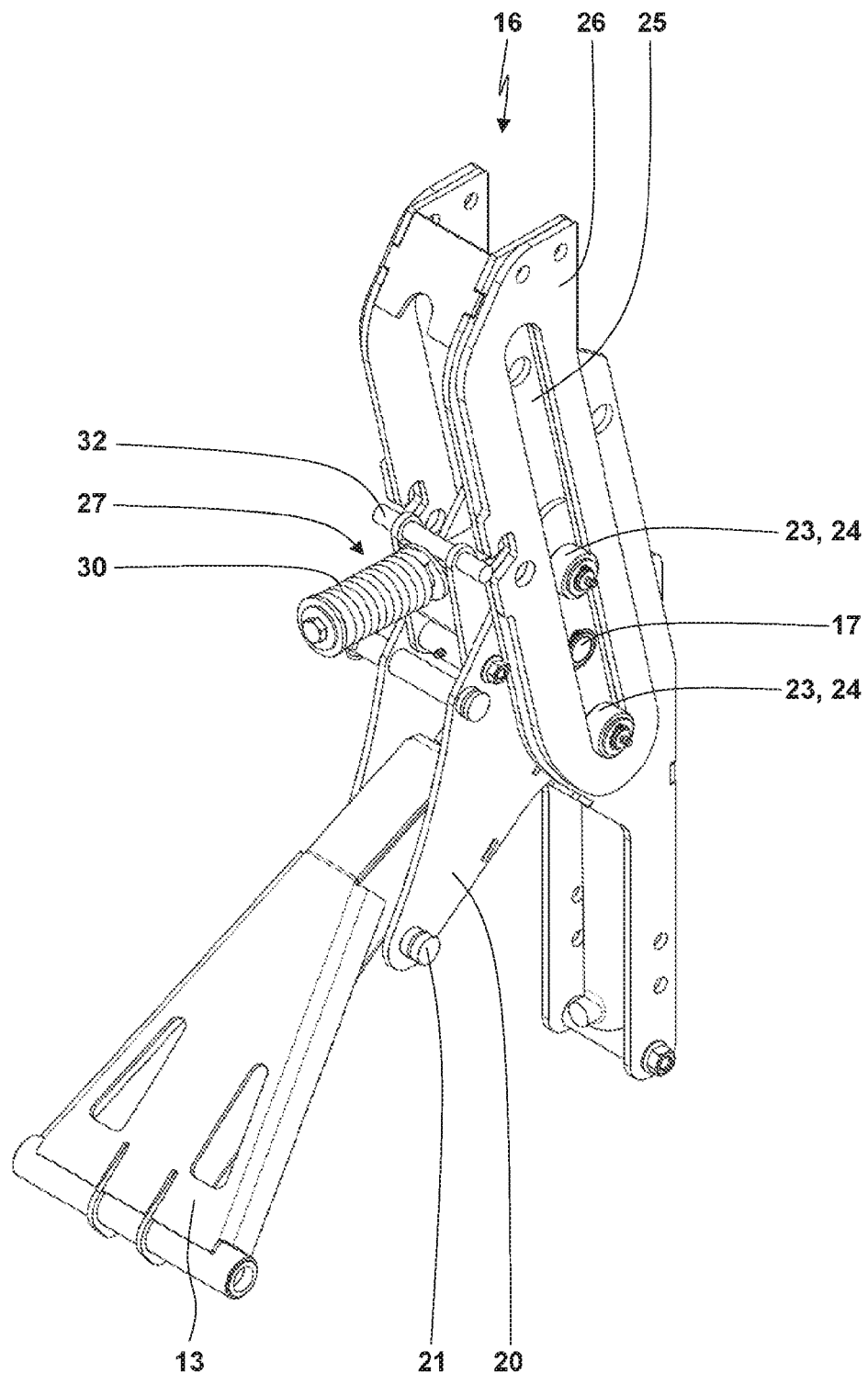
FIG. 16 shows a perspective view of the lifting device with the safety device in the released position.
Figure 17:
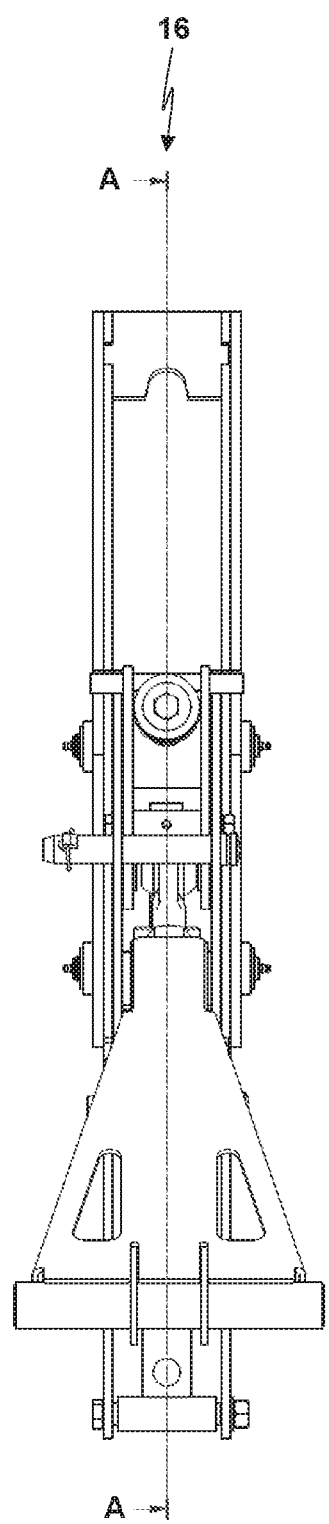
FIG. 17 shows a rear view of the lifting device according to FIG. 16.
Figure 18:
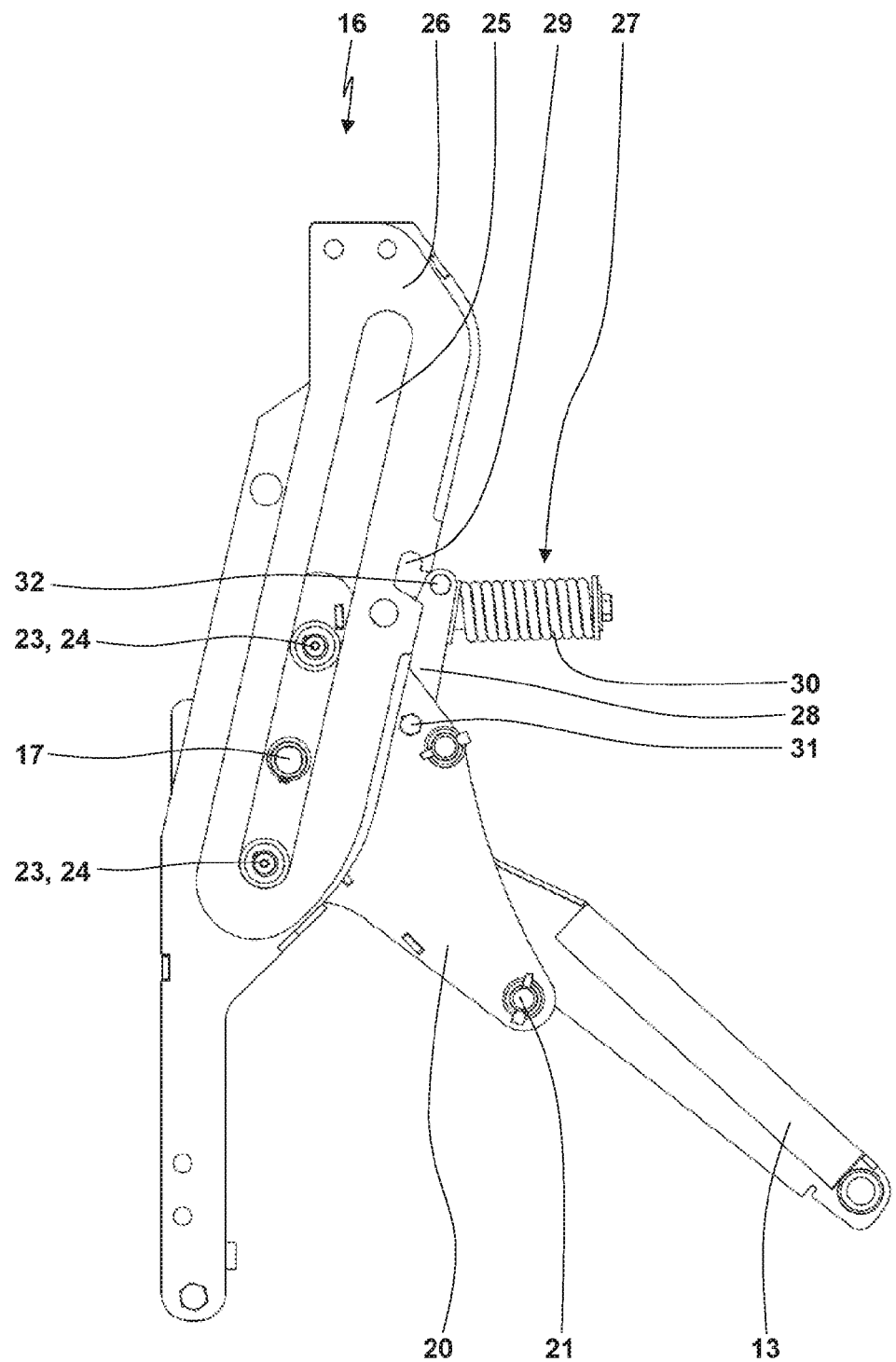
FIG. 18 shows a side view of the lifting device according to FIG. 16.
Figure 19:
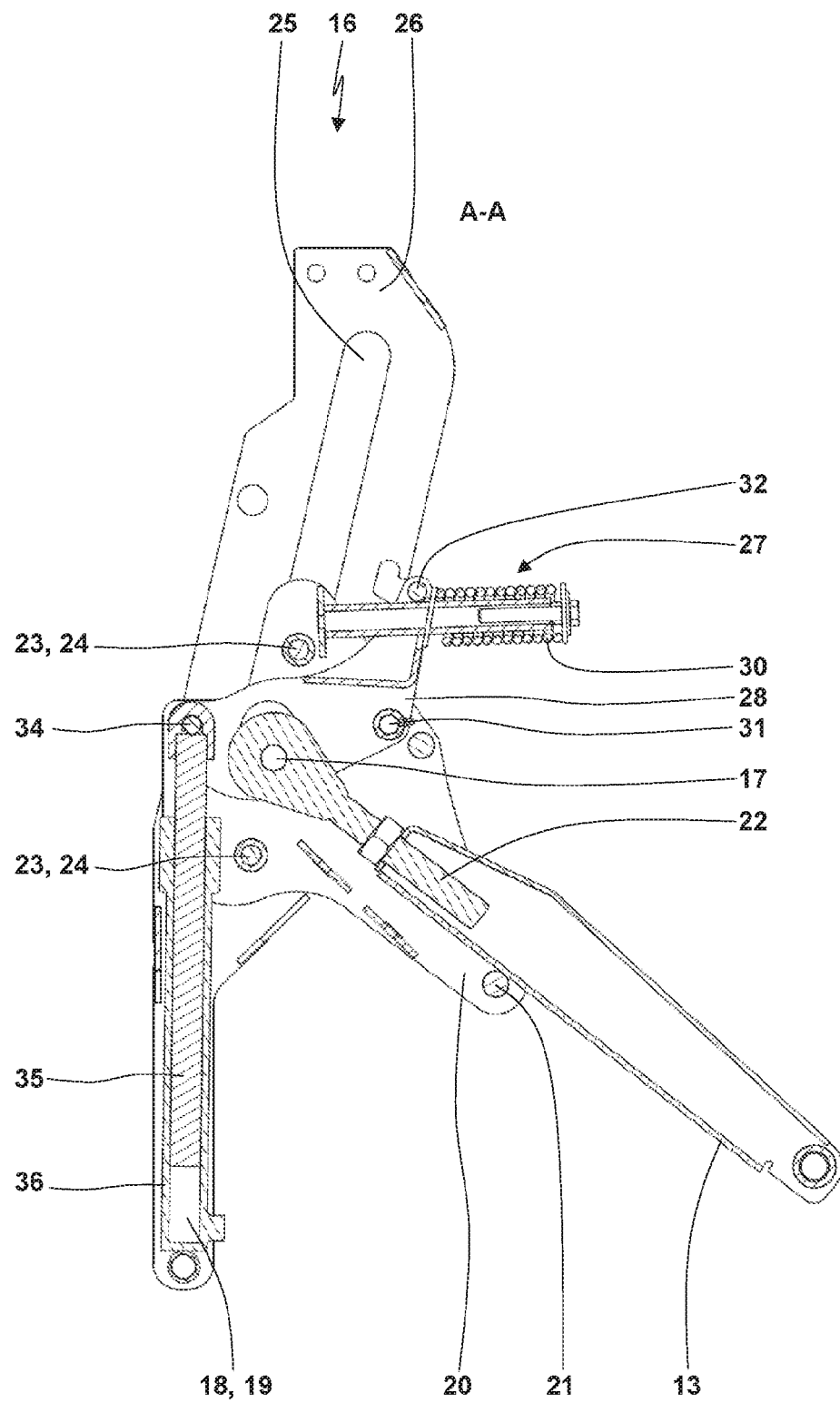
FIG. 19 shows a sectional view of the lifting device according to line A-A in FIG. 17.
Figure 20:
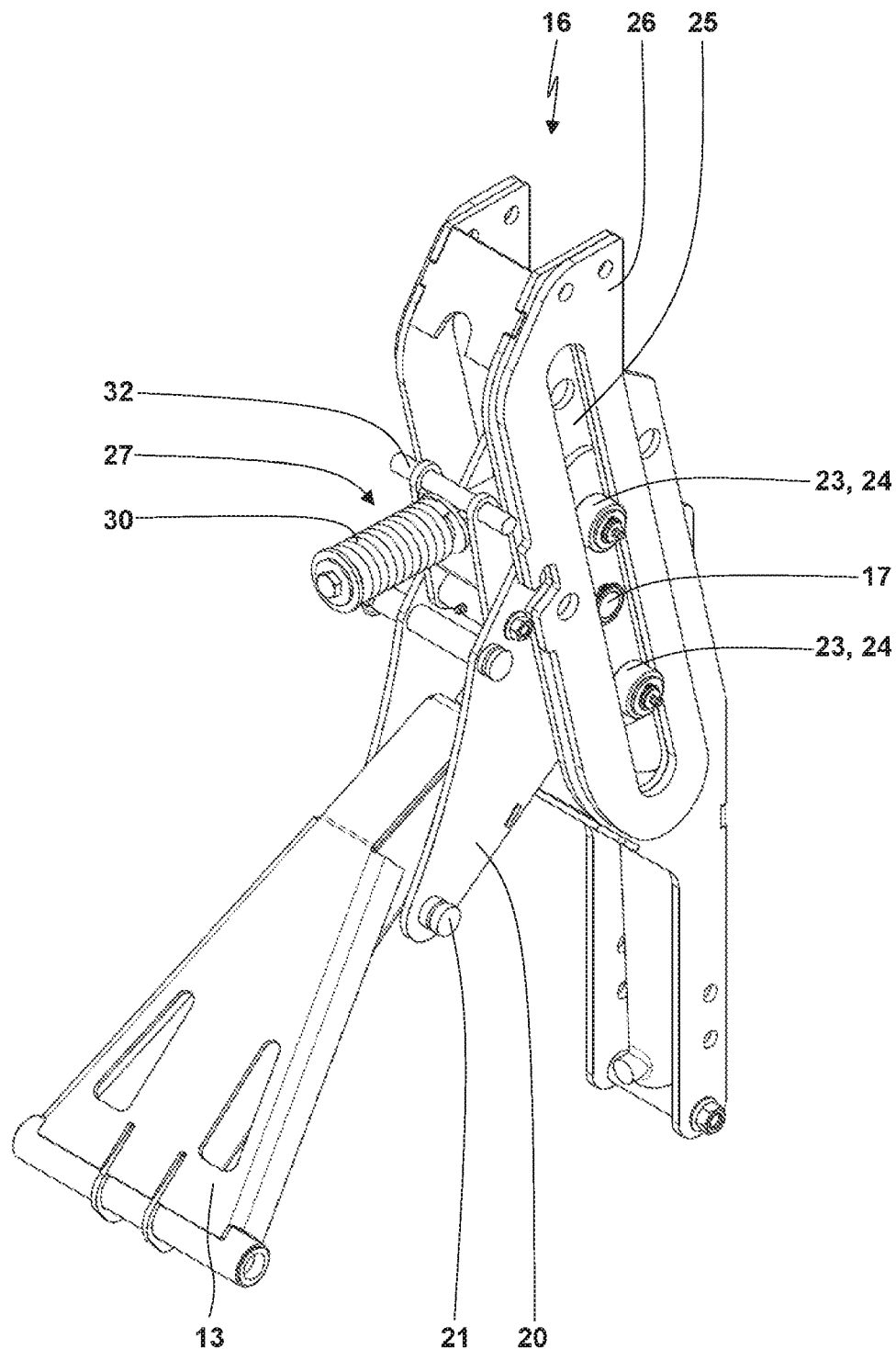
FIG. 20 shows a perspective view of the lifting device with the safety device in the released position and the partly lifted position.
Figure 21:
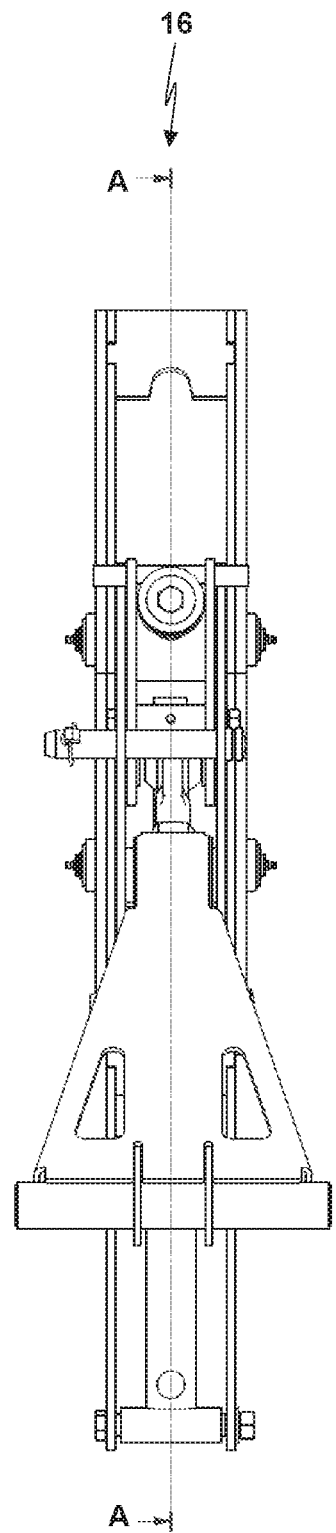
FIG. 21 shows a rear view of the lifting device according to FIG. 20.
Figure 22:
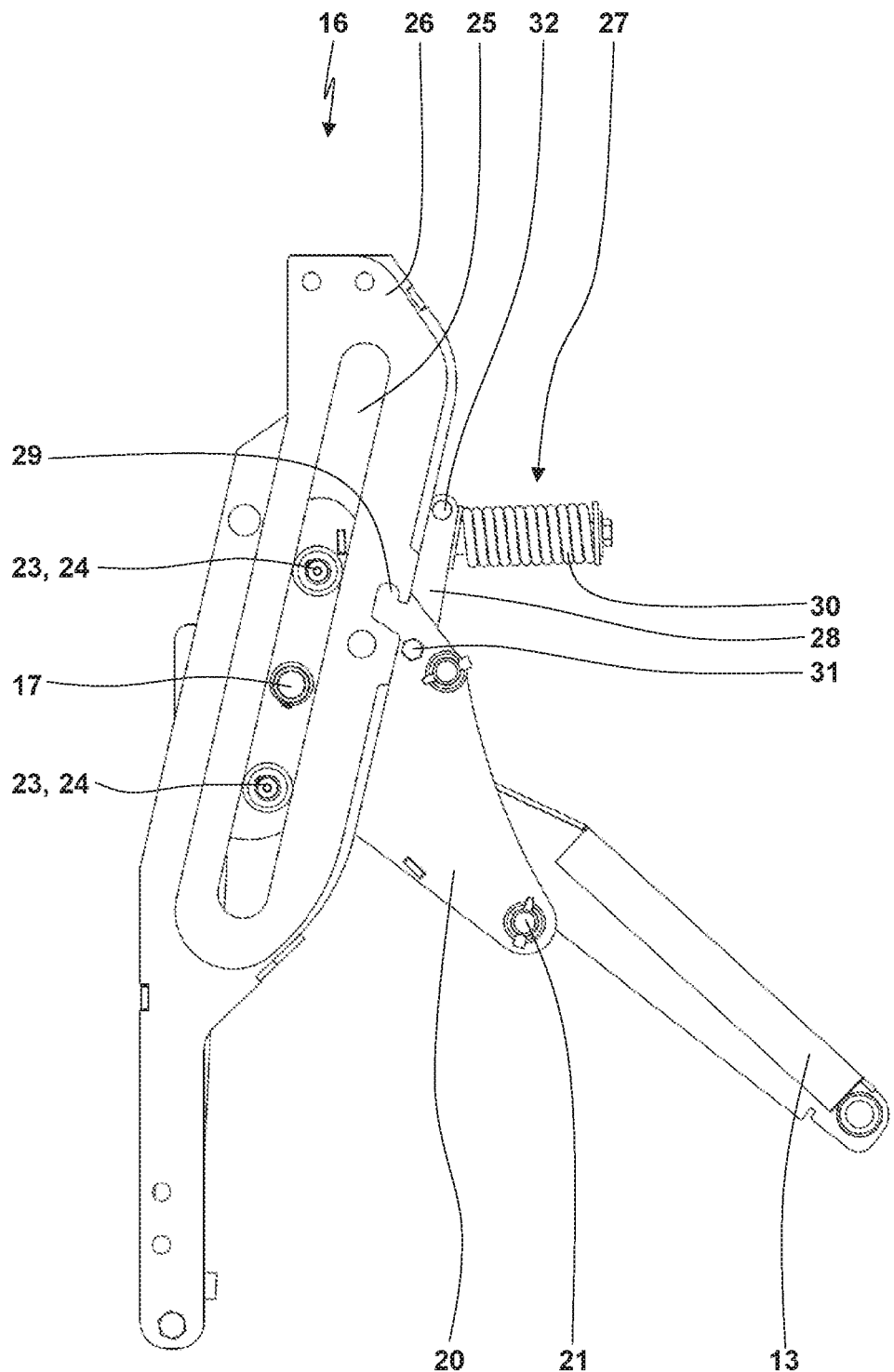
FIG. 22 shows a side view of the lifting device according to FIG. 20.
Figure 23:
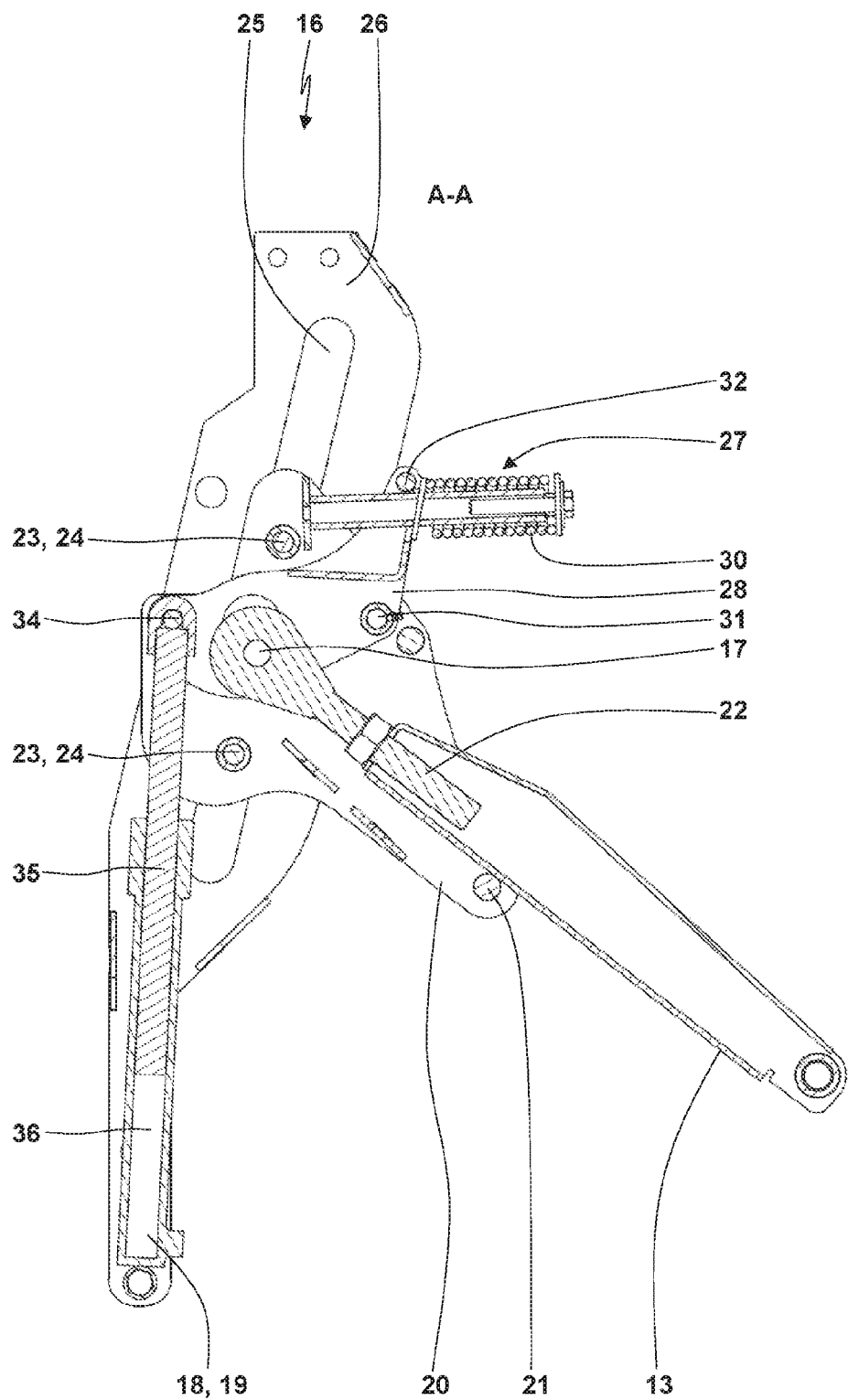
FIG. 23 shows a sectional view of the lifting device according to line A-A in FIG. 21.
Figure 24:
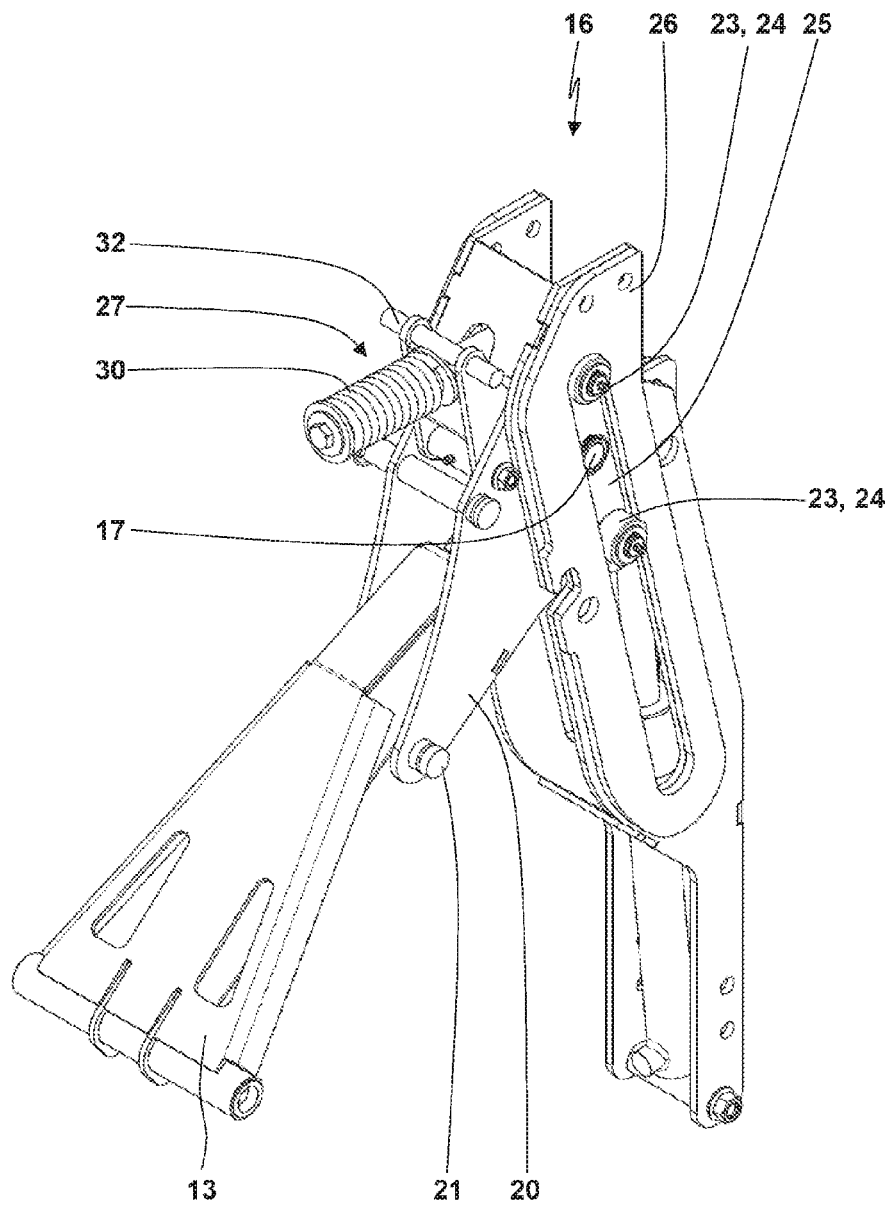
FIG. 24 shows a perspective view of the lifting device with the safety device in the released position and the completely lifted position.
Figure 25:
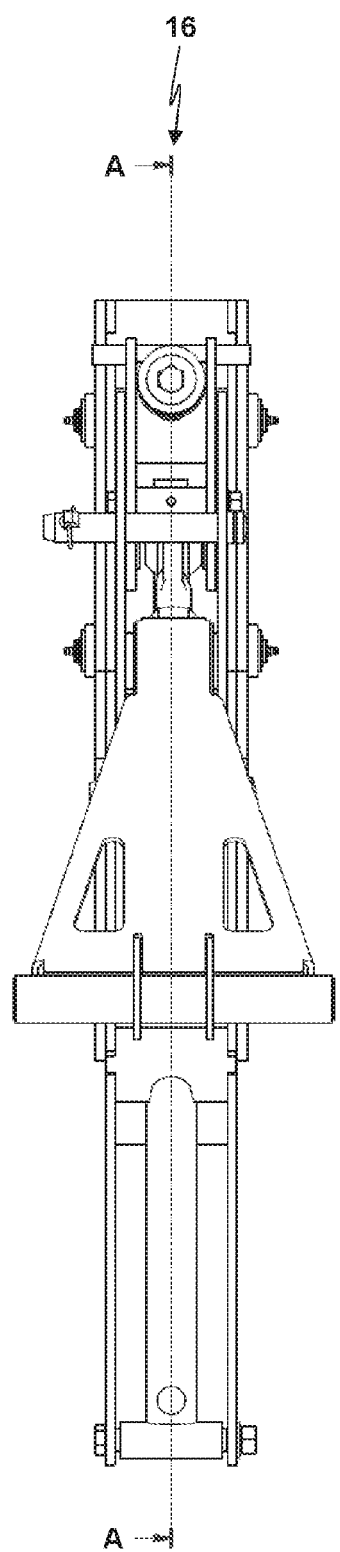
FIG. 25 shows a rear view of the lifting device according to FIG. 24.
Figure 26:
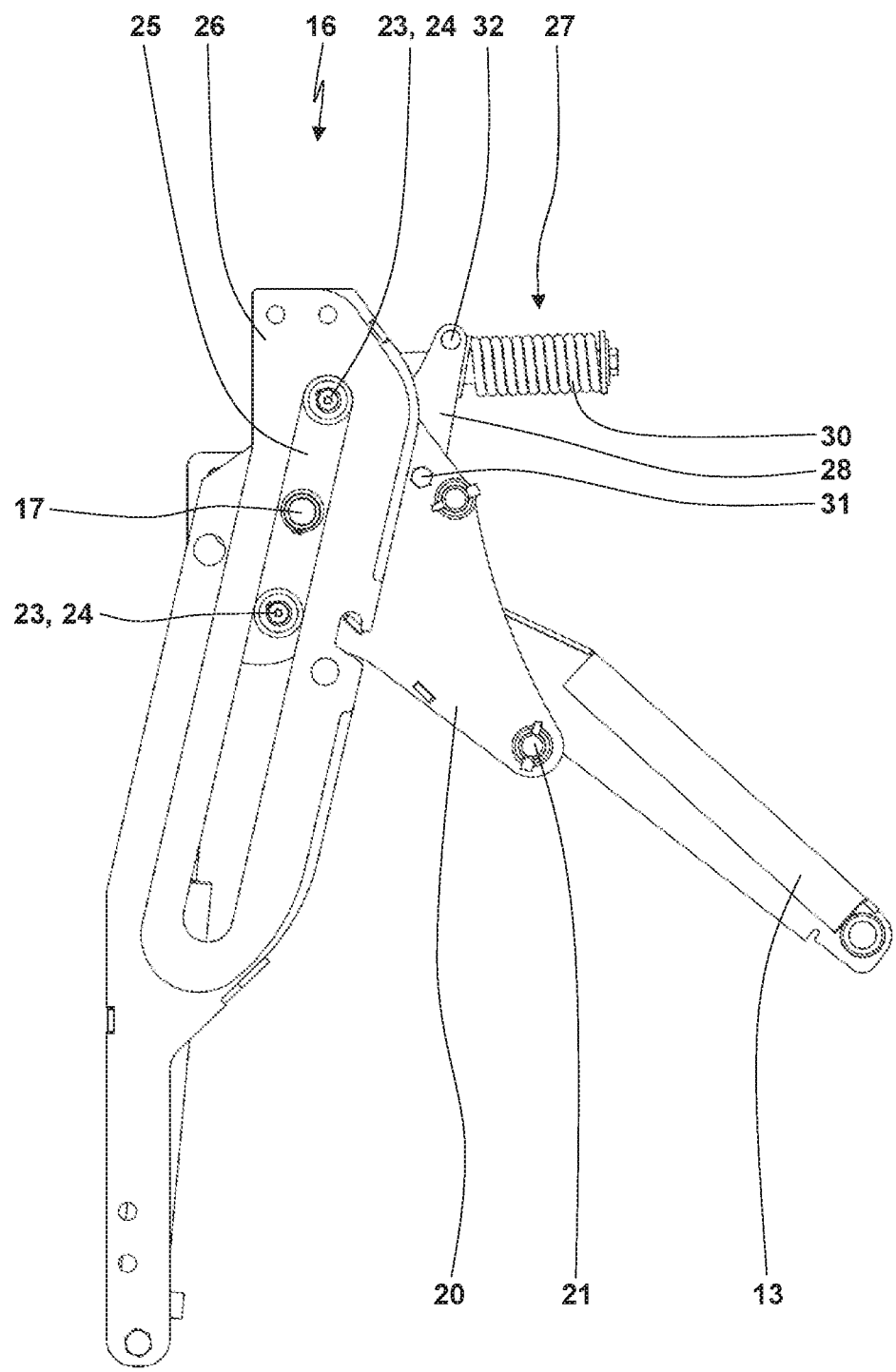
FIG. 26 shows a side view of the lifting device according to FIG. 24.
Figure 27:
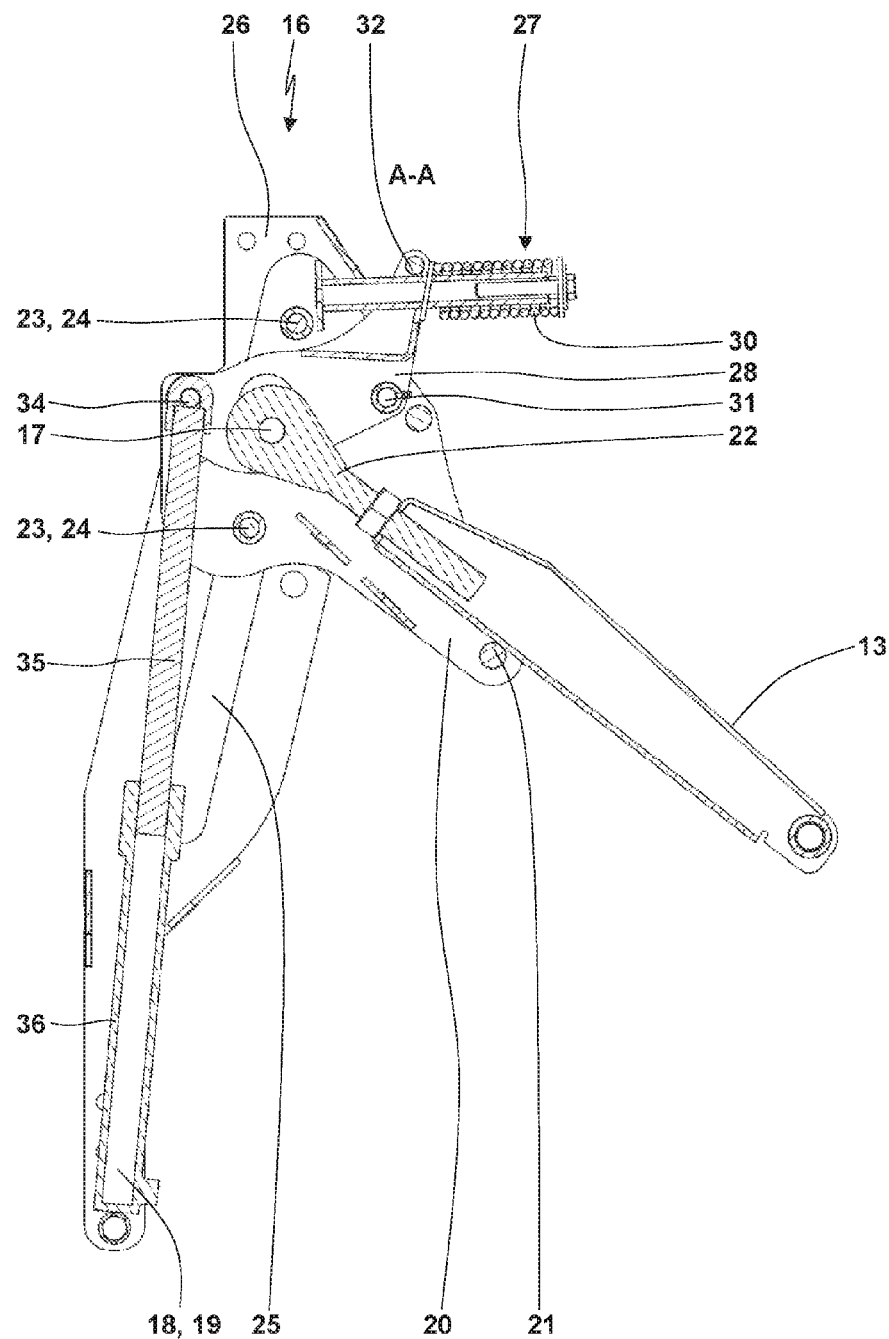
FIG. 27 shows a sectional view of the lifting device according to line A-A in FIG. 25.
Figure 28:
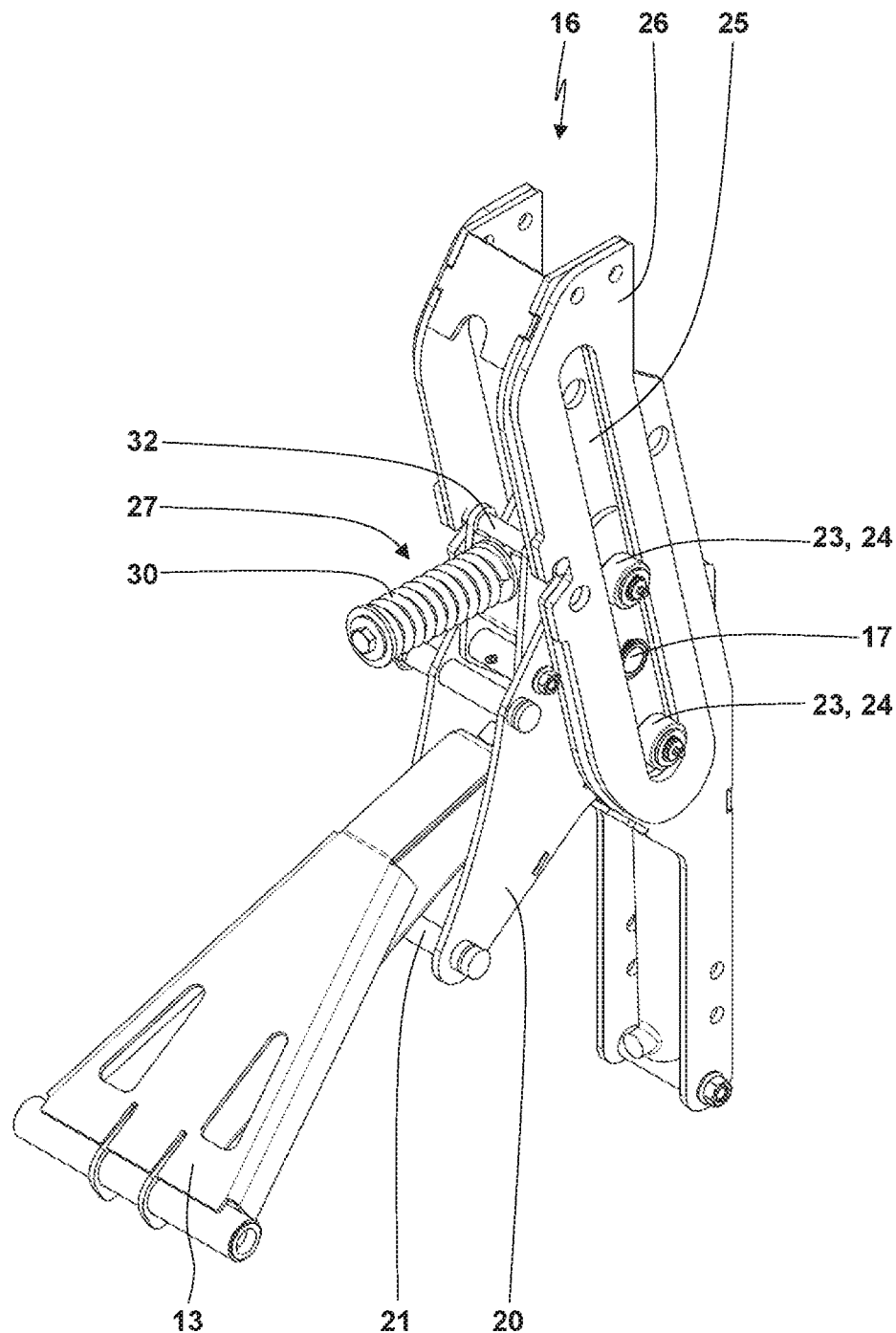
FIG. 28 shows a perspective view of the lifting device with the safety device in the locked position.
Figure 29:
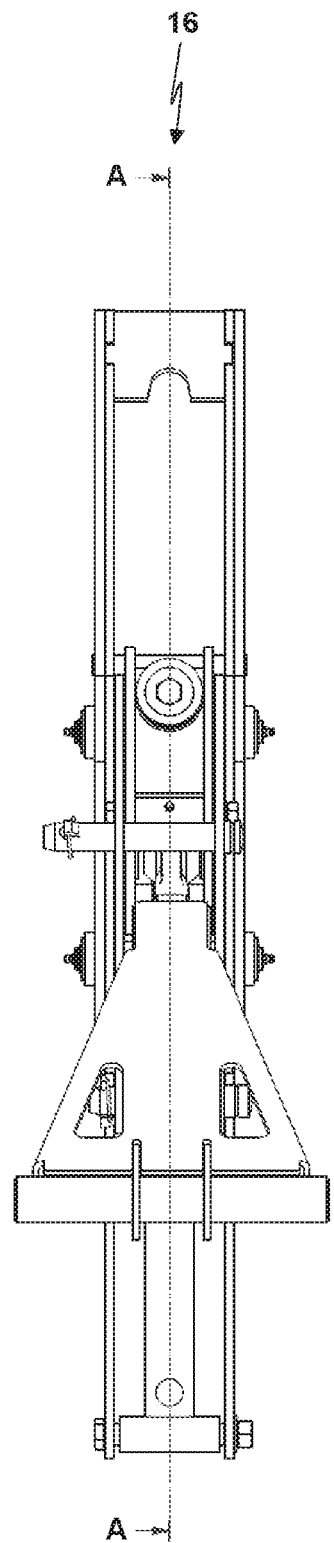
FIG. 29 shows a rear view of the lifting device according to FIG. 28.
Figure 30:
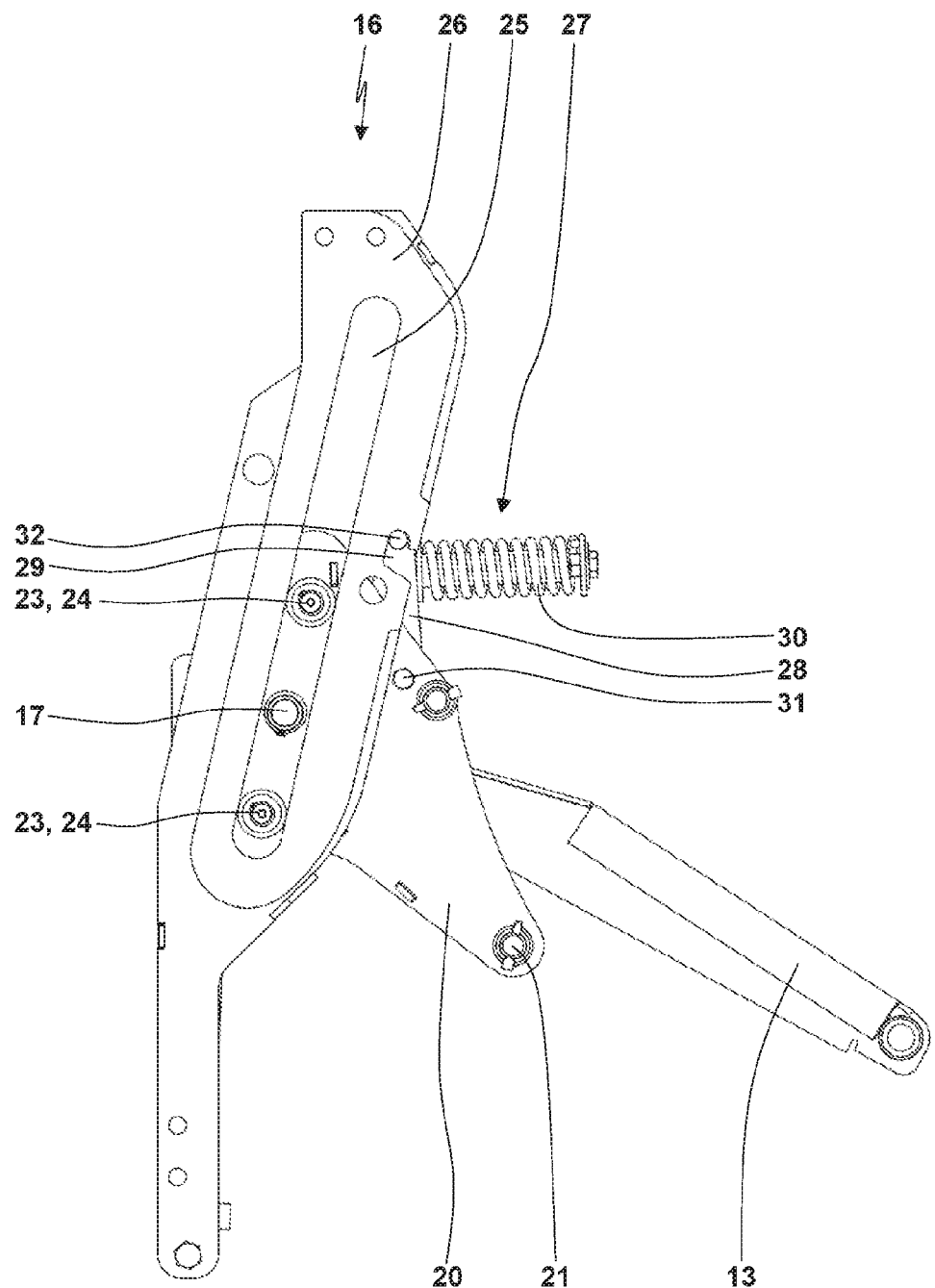
FIG. 30 shows a side view of the lifting device according to FIG. 28.
Figure 31:
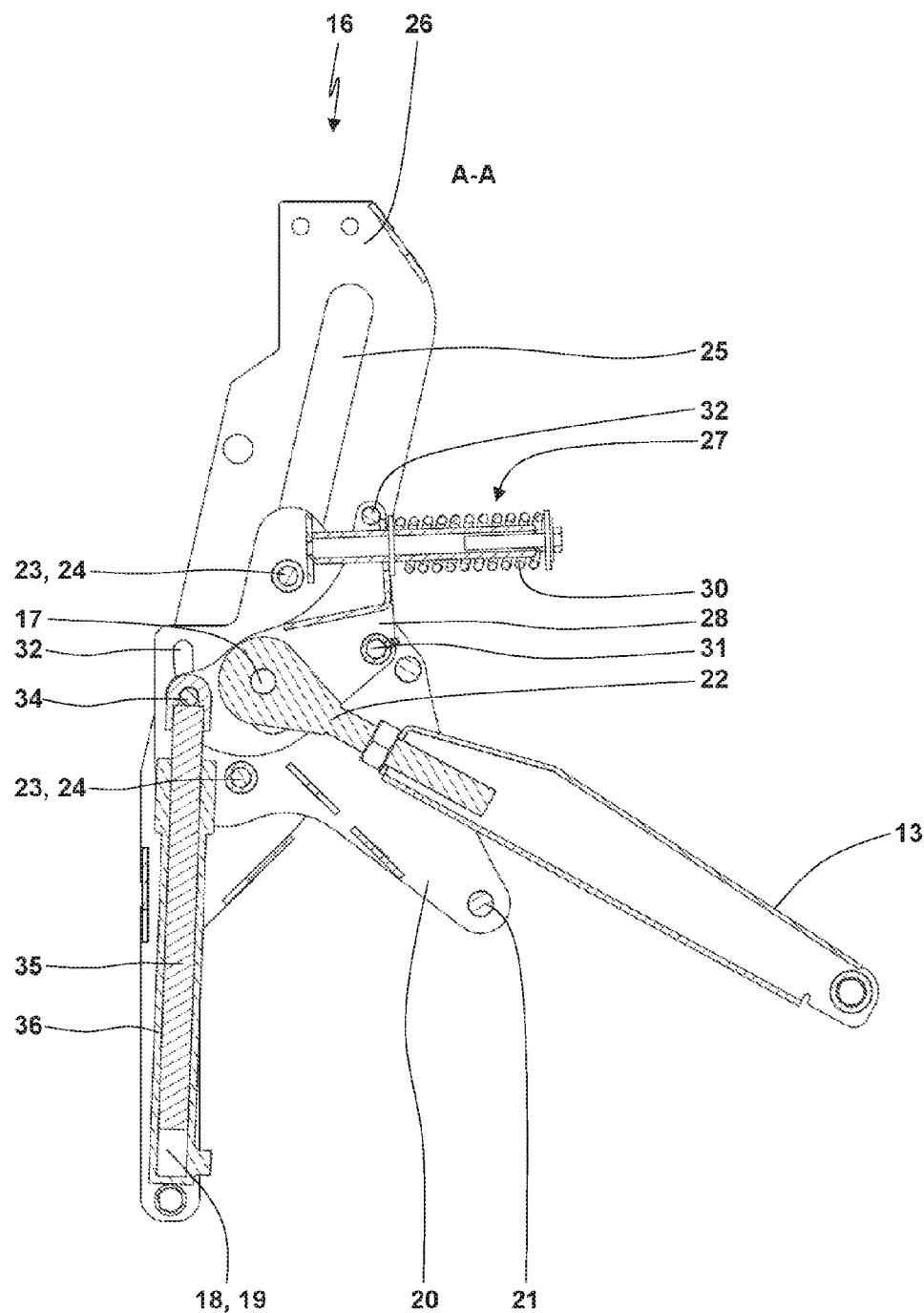
FIG. 31 shows a sectional view of the lifting device according to line A-A in FIG. 29.

FIGS. 1-7 show various views of the operating conditions of the header 2. FIGS. 1 and 2 show the operational position. FIGS. 3 and 4 a partly lifted position and the FIGS. 5 and 6 the completely lifted position. FIG. 7 shows a perspective view of the header 2 in its operational position.

In order to improve the legibility of the drawings, not all reference signs have been incorporated in all drawings. This concerns mainly the repeated depiction of identical components in different positions.

Secondary Implement

Besides the primary implement 6, the combine harvester 1 has a, in particular modularly designed, secondary implement 8. In this embodiment, it is designed as a cutting unit and serves for cutting the crop stubbles of the cut crop left standing by the primary implement 6 on the ground 5. When moving the combine harvester 1 in the direction of travel 4, therefore, the crops are first cut by the primary implement 6 at a greater height above the ground 5. Then during the further travel all the remaining stubbles are cut down and/or up by the secondary implement 8 nearer to the ground 5.

The secondary implement 8 has a roller unit 9 with a plurality—here, three—of roller sets 10. In the present case, each roller set 10 has two rollers 11, but could also have more or fewer rollers 11. The secondary implement 8 therein is supported on the ground 5 by means of the roller unit 9 and/or is moved by this unit during the harvesting operation of the combine harvester 1. The rollers 11 are designed in a cage-like manner and, in particular, consist of metal. The rollers 11 provide the secondary implement 8 with a good guidance, also in the case of difficult soil conditions—e.g. rocks, holes, slopes, etc.

The secondary implement 8, here configured as a cutting unit, has knife bars with blades 12 attached thereto. The cutting unit, and particularly the blades 12, can be easily damaged, which, however, is prevented by what is described below.

The secondary implement 2 is connected to a link 13. The link 13 here is shown as an upper link 14. Also a lower link 15 is provided for further fixing.

Lifting Device

The new header 2 has a lifting device 16 that is designed and connected by means of a link bearing 17 to the link 13, such that a translational movement of the link bearing 17 causes a lifting of the secondary implement 8 relative to the primary implement 6.

For this purpose, the lifting device 16 has an actuating device 18 which is designed here as a piston-cylinder unit 19. The piston-cylinder unit 19 has a piston 35 that is driven to make a reciprocating movement in a cylinder 36. This piston-cylinder unit 19, through the translational movement of the piston 35, causes a translational movement of the secondary implement 8 so that it is lifted up.

From FIGS. 1 and 2 it can be seen that, in the operating condition of the combine harvester 1 shown here, the secondary implement 8 is located substantially below primary implement 6 and thus nearer to the ground. This enables the cutting down of the stubbles left standing by the primary implement 6.

Now, if the header 2 is brought into the lifted position shown in FIGS. 4 and 6, then the distance between the lower surface of the primary implement 6 and the ground 5 is sufficient for passing over trenches and similar impediments. But, as the secondary implement 8 is situated much lower, there is a risk of damage.

In order to prevent this type of damage, the secondary implement 8 can now be lifted relative to the primary implement 6 and brought into its lifted position as shown in FIGS. 5 and 6. In this position, the sensitive part of the cutting unit and, in particular, the blades 12 are positioned at a level above the lower edge of the primary implement 6, so that the blades 12 are protected when crossing impediments by this edge.

FIGS. 8-31 show various views and operational positions of an exemplary embodiment of the lifting device 16. In the described example, the header 2 has two lifting devices 16 of this type which are arranged at the header 2. But it could also be provided with only one lifting device 16, or also three or more lifting devices 16.

The lifting device 16 has a slide element 20 and a stop or contact point 21 that is here formed as a pin. The gravity dependent contact with the link 13 passes over said contact point 21. The permanently rotatable connection between the link 13 and the lifting device 16 is achieved by means of a coupling part 22 and the link bearing 17. The coupling part 22 is rotatably connected via the link bearing 17 to the slide element 20.

The slide element 20 has guide elements 23 that are designed here as guide rollers 24. But, for example, these could also be pins. The guide elements 23 engage in a guiding slot 25 of a guide component 26. The guide component 26 is fastened to the rear side of the primary implement 6.

Safety Device

The lifting device 16 further has a safety device 27. The safety device 27 has a safety latch 28, a safety slot 29 and a safety spring 30. The safety spring 30 presses the safety latch 28 into the safety slot 29, while the safety latch 28 is rotatably connected via a bearing 31 to the slide element 20. Herein, the safety latch 28 is connected to a safety pin 32, which then finally sits in the safety slot 29.

The slide element 20 further has a track-shaped release slot 33 which guides a pin 34. The pin 34 is connected with the actuating device 18 as well as with the safety latch 28.

Safety Position

FIGS. 8-11 show the safety position of the safety device 27 of the lifting device 16.

The secondary implement 8 touches the ground 5 and the link 13 is not touching the contact point 21. In this way, no weight force is transferred. The safety spring 30 presses the safety latch 28 with its safety pin 32 into the safety slot 29. The actuating device 18 is situated in its lowered position and the pin 34 is situated in the lower region of the release slot 33.

Release Position

FIGS. 12-15 show the release position of the safety device 27.

The link 13 is now situated at the contact point 21 and transfers over it a force which is derived from the secondary implement 8 that is connected with the link 13.

Phrased differently, because of the lifting of the header 2, the secondary implement 8 no longer makes contact with the ground 5.

Released Position

If now, starting from the release position, the actuating device 18 is activated in the sense of an extension of the piston 35 from the cylinder 36, a translational movement due to the effective gravity of the secondary implement 8 on the contact point 21 of the slide element 20 along the guide slot 25 will be prevented, and instead, the safety latch 28 will be swivelled about the bearing 31 in a clockwise direction. This swivelling movement is made possible by the release slot 33 in that the pin 34 is moved upward in a slight curve. At the other end of the safety latch 28, the safety pin 32 will move out of the safety slot 29.

This position is designated the released position and is shown in FIGS. 16-19.

Partly Lifted Position

When, starting from said released position, the actuating device 18 is further activated in the sense of lifting, then the partly lifted position shown in FIGS. 20-23 is reached.

It can be easily seen that further extension of the piston 35 from the cylinder 36 has now led to a movement of the slide element 20 with its guide elements 23 in the guide slot 25. Here the translational movement of the piston 35 has been transferred to the slide element 20. Thus, the link bearing 17 has also been moved upward in a translational manner. As the link 13 is connected via the coupling part 22 and the link bearing 17 with the slide element 20 and lies on the contact point 21, also the link 13 and thus its connected secondary implement 8 are moved upward in a translational manner.

Maximum Raised Position

The movement described above is continued when the piston 35 extends further out of the cylinder 36 until the maximum raised position is reached as is shown in FIGS. 24-27.

Locked Position

Besides the lifting function, the new secured lifting device 16 also has a safety function which leads to the locked position shown in FIGS. 18-31.

This locked position is taken up when, starting from the safety position in FIGS. 8-11, the actuating device 18 is moved upward. In this case, the full weight force of the secondary implement 8 is not applied to the contact point 21. In other words, the header 2 is not lifted, or not lifted sufficiently to release the secondary implement 8 from the ground 5.

Thus, the force of the safety spring 30 cannot be overcome, so that with an extension of the piston 35 a swivelling of the safety latch 28 is prevented. The safety pin 32 therefore remains in the safety slot 29 and is moved upward into the safety slot 29, due to the translational movement of the piston 35 and the transfer via the safety latch 28 upward.

Therein, the safety pin 32 reaches the end of the safety slot 29, so that a continuation of the translational movement is not possible. A rotational movement of the safety latch is also not possible as the safety slot 29 is shaped somewhat in a closed semicircle. Thus, the safety pin 32 cannot leave the safety slot 29 and the locked position remains in force.

The invention claimed is:

1. A header for a combine harvester, the header comprising:
   a primary implement;
   a secondary implement;
   a link that is connected with the secondary implement; and
   a lifting device, including:
      a slide element connected with the link and including a guide element;
      a link bearing which rotatably connects the link to the slide element;
      a guide component with a guide slot, the guide element of the slide element engaging with the guide slot such that a translational movement of the slide element causes a lifting of the secondary implement relative to the primary implement; and
      an actuating device comprising a piston-cylinder unit connected with the slide element and driveable in a translational direction such that its translational movement is transferred onto the slide element and thereby onto the secondary implement to lift the secondary implement, and wherein the translational movement of the actuating device is operable to effect the translational movement of the slide element such that the guide component moves in the guide slot and thereby lifts the secondary implement relative to the primary implement.

2. Header according to claim 1, wherein the link is configured as an upper link and that the Header further comprises a link.

3. Header according to claim 1, wherein the lifting device is configured such that the secondary implement can only be lifted relative to the primary implement when the secondary implement is released from the ground due to a lifting of the header.

4. Header according to claim 1, wherein the lifting device has a safety device that prevents an unwanted lifting of the secondary implement relative to the primary implement.

5. Header according to claim 4, wherein the safety device has a safety latch, a safety slot and a safety spring, wherein the safety latch is loaded by the safety spring in the direction of the safety slot.

6. Header according to claim 5, wherein
the safety device has a safety position, a release position and a locked position, wherein:
   in the safety position, the safety latch engages into the safety slot and an activation of the actuating device does not lead to the lifting of the secondary implement relative to the primary implement;
   in the release position, the safety latch engages in the safety slot and an activation of the actuating device leads to the safety latch being released from the safety slot and subsequently to the secondary implement being lifted relative to the primary implement; and
   in the locked position, the safety latch engages in the safety slot in such a manner that an activation of the actuating device leads to the safety latch not being released from the safety slot and that the secondary implement cannot be raised relative to the primary implement.

7. Header according to claim 6, wherein the spring force of the safety spring is dimensioned and adapted to the mass of the secondary implement such that the safety device takes up the following positions:
   the safety position when the secondary implement does not act with its full weight force on the lifting device; and
   the release position when the secondary implement acts with its full weight force on the lifting device.

8. Header according to claim 7, wherein:
   the actuating device can be driven in such a translation manner that the translation movement is transferred onto the secondary implement and that the secondary implement is lifted; and
   the spring force of the safety spring is dimensioned and adapted to the mass of the secondary implement such that the safety device takes the locked position when the secondary implement does not act with its full weight force on the lifting device and the actuating device is activated.

9. Header according to claim 1, wherein the primary implement is the form of a main cutting unit of the header.

10. Header according to claim 1, wherein the secondary implement is a mowing unit, a chopping unit or a swathing unit.

11. A header for a combine harvester, comprising:
    a primary implement;
    a secondary implement;
    a link that is connected with the secondary implement; and
    a lifting device, including:
       a slide element connected with the link;
       a guide component with a guide slot, the slide element is configured for engaging with the guide slot such that a translational movement of the slide element causes a lifting of the secondary implement relative to the primary implement; and
       a safety device that prevents an unwanted lifting of the secondary implement relative to the primary implement, the safety device including a safety latch, a safety slot, and a safety spring, wherein the safety latch is loaded by the safety spring in the direction of the safety slot.

12. The header according to claim 11, wherein the lifting device has an actuating device, and the safety device has a safety position, a release position, and a locked position, wherein:
    in the safety position, the safety latch engages into the safety slot and an activation of the actuating device does not lead to the lifting of the secondary implement relative to the primary implement;

in the release position, the safety latch engages in the safety slot and an activation of the actuating device leads to the safety latch being released from the safety slot and subsequently to the secondary implement being lifted relative to the primary implement; and in the locked position, the safety latch engages in the safety slot in such a manner that an activation of the actuating device leads to the safety latch not being released from the safety slot and that the secondary implement cannot be raised relative to the primary implement.

13. The header according to claim 12, wherein the spring force of the safety spring is dimensioned and adapted to the mass of the secondary implement such that the safety device takes up the following positions:

the safety position when the secondary implement does not act with its full weight force on the lifting device; and the release position when the secondary implement acts with its full weight force on the lifting device.

14. The header according to claim 13, wherein:

the actuating device can be driven in such a translation manner that the translation movement is transferred onto the secondary implement and that the secondary implement is lifted; and the spring force of the safety spring is dimensioned and adapted to the mass of the secondary implement such that the safety device takes the locked position when the secondary implement does not act with its full weight force on the lifting device and the actuating device is activated.

* * * * *